F. H. PIERPONT.
PUNCH CUTTING AND MATRIX CUTTING MACHINE.
APPLICATION FILED JULY 17, 1906.
938,074.
Patented Oct. 26, 1909.
12 SHEETS—SHEET 1.
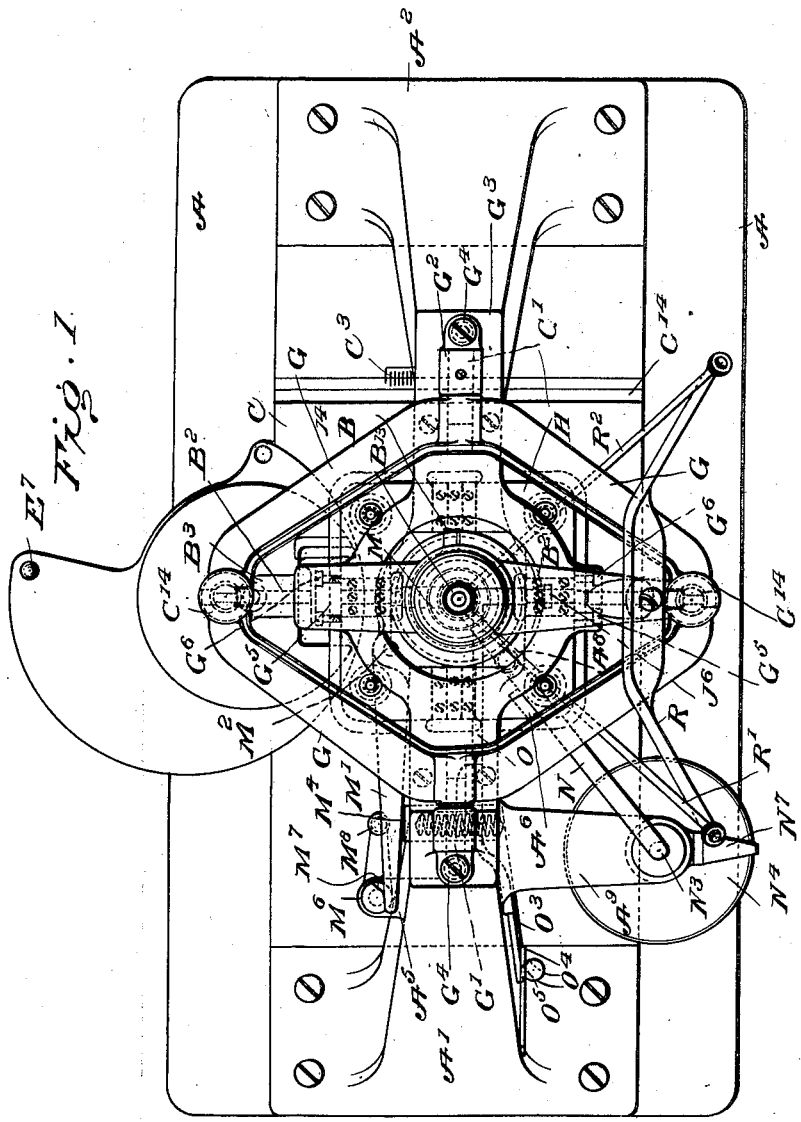

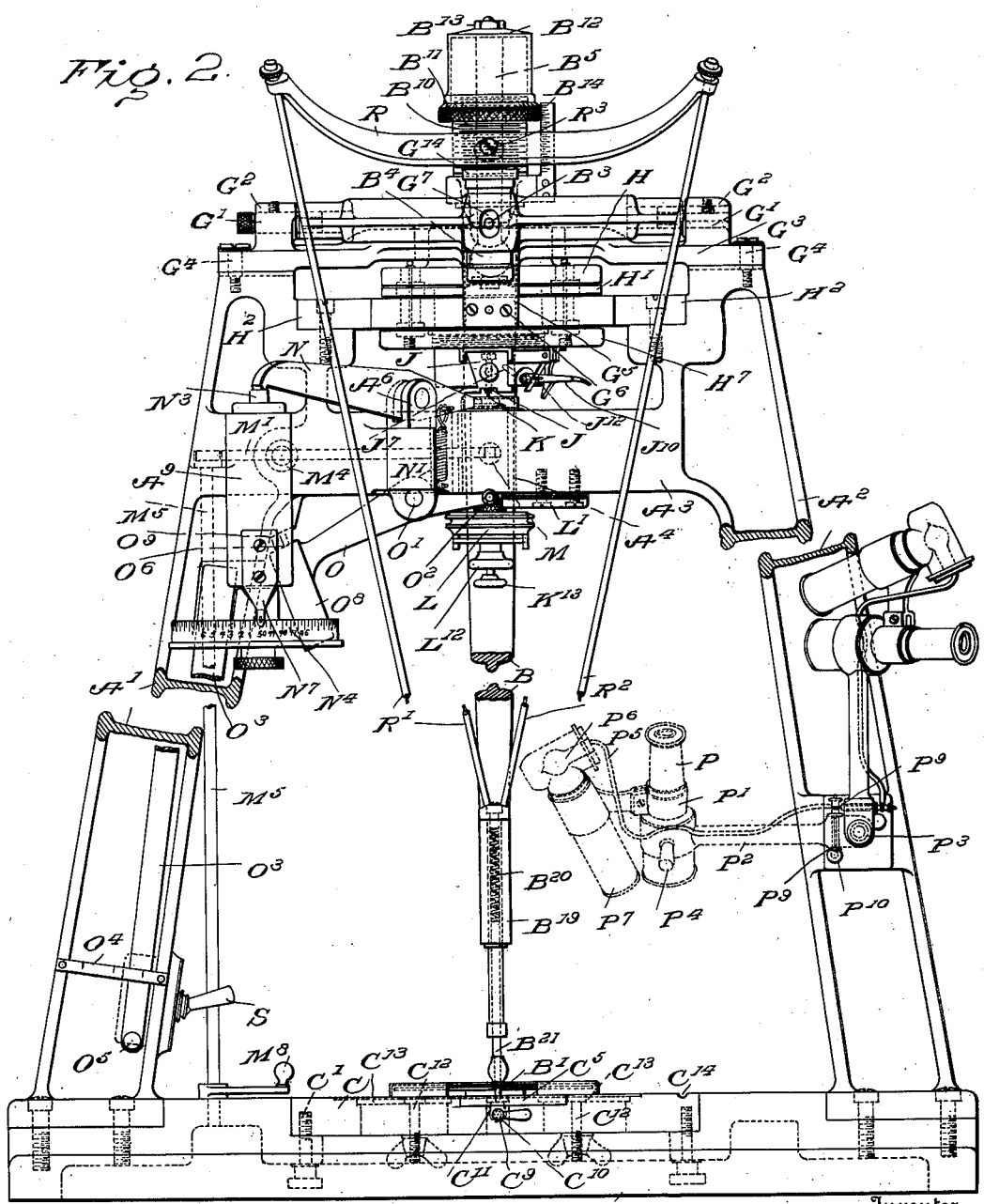

F. H. PIERPONT.
PUNCH CUTTING AND MATRIX CUTTING MACHINE.
APPLICATION FILED JULY 17, 1906.
938,074.
Patented Oct. 26, 1909.
12 SHEETS—SHEET 3.
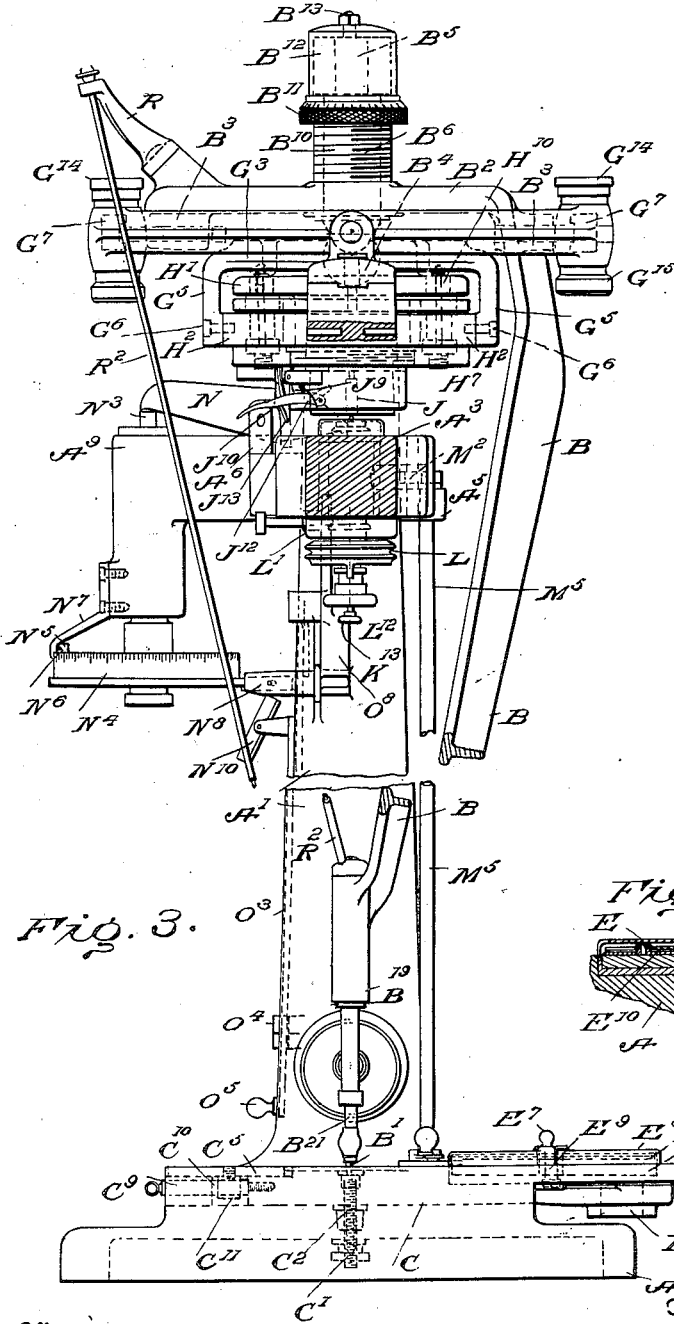
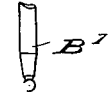
Fig. 29.
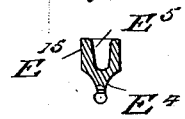
Fig. 25.
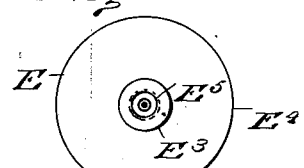
Fig. 23.
Fig. 24.
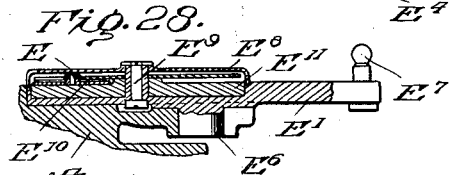
Fig. 28.
Witnesses
Thomas Durant
Inventor
Frank Herman Pierpont,
By Church & Church
his Attorneys

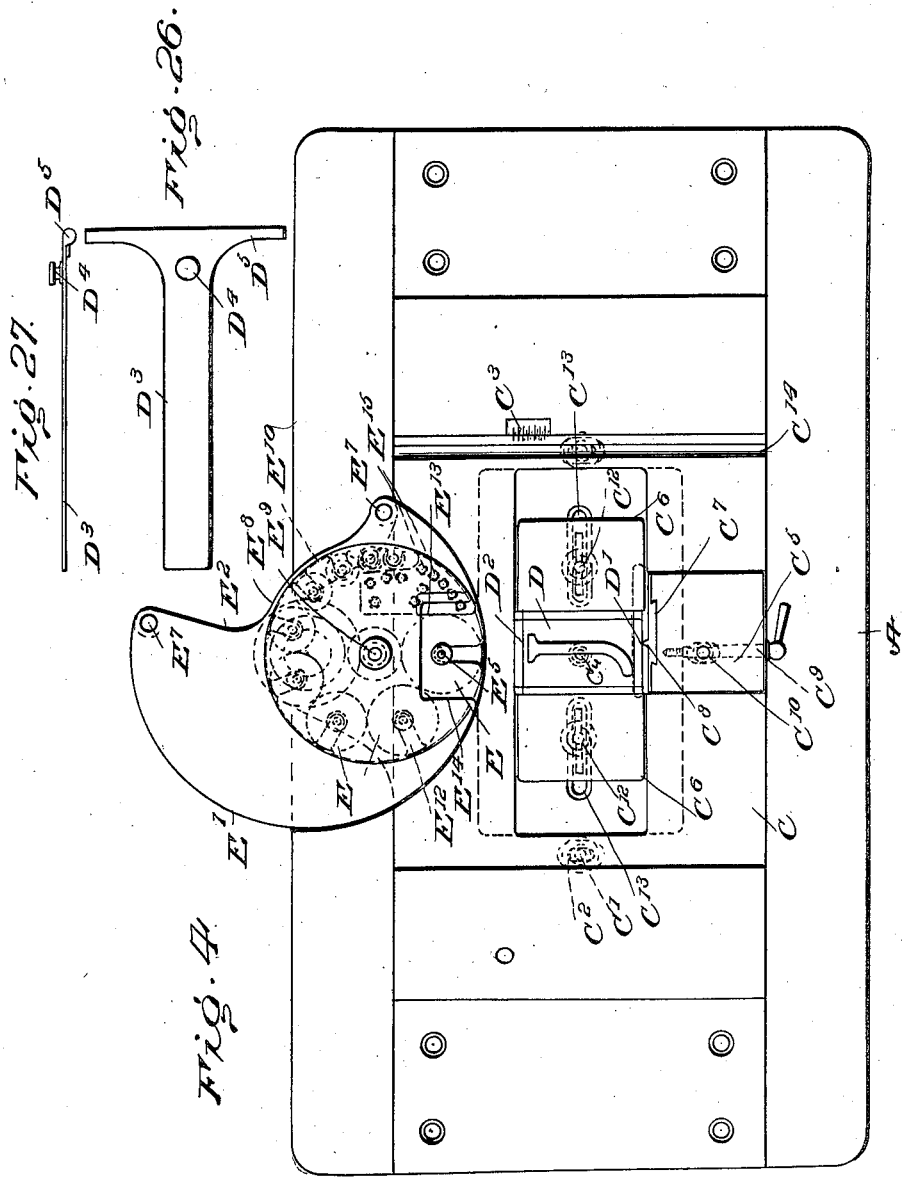

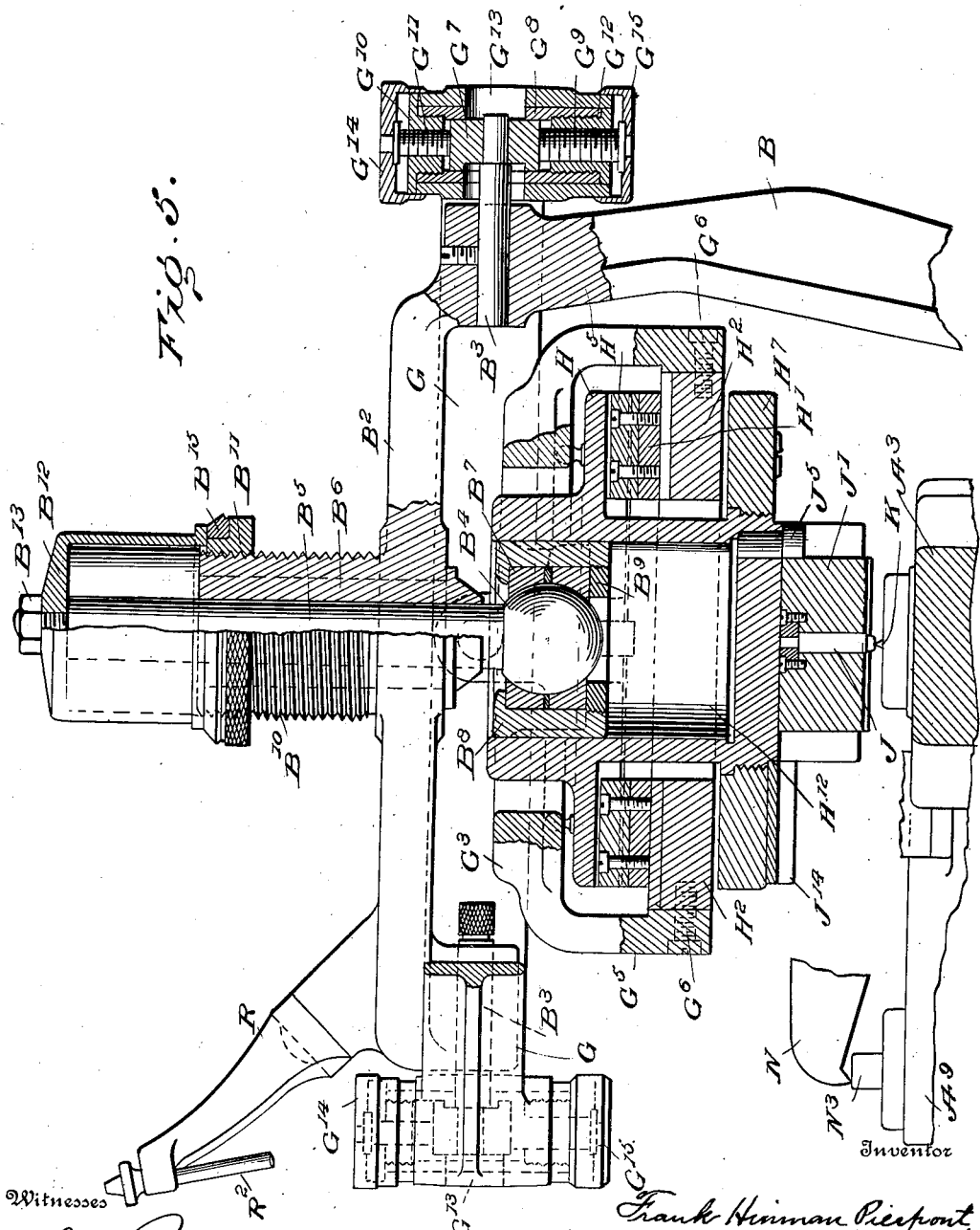

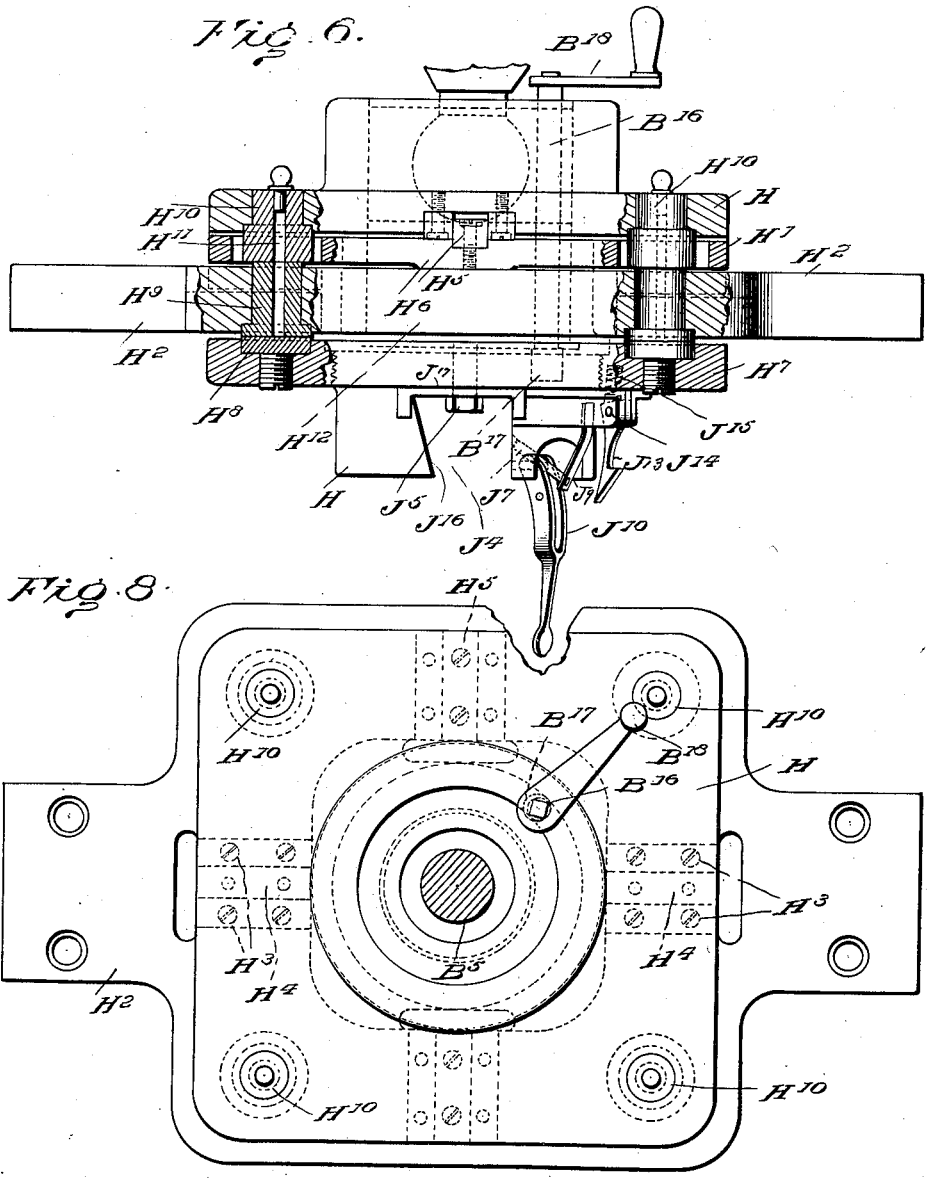

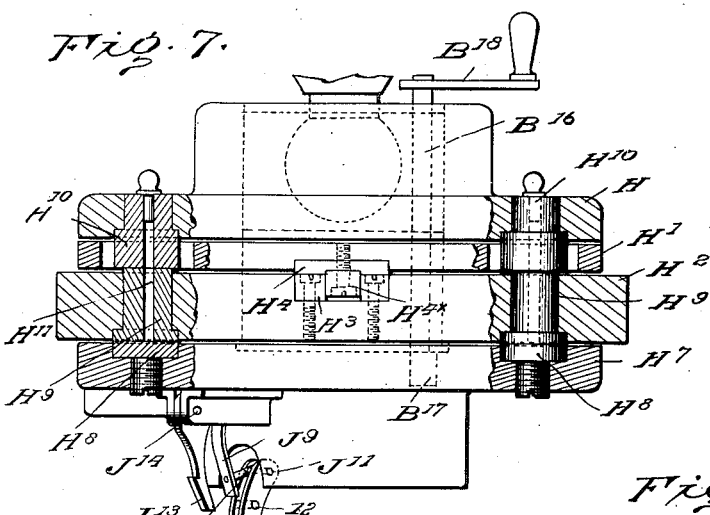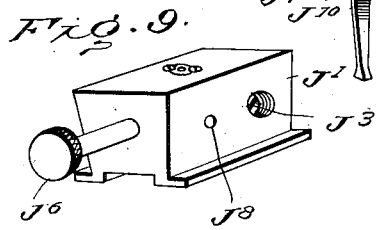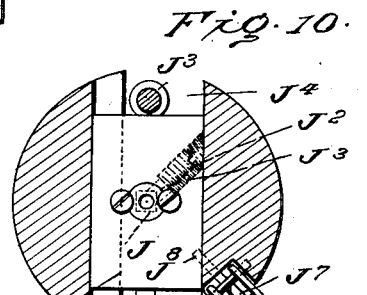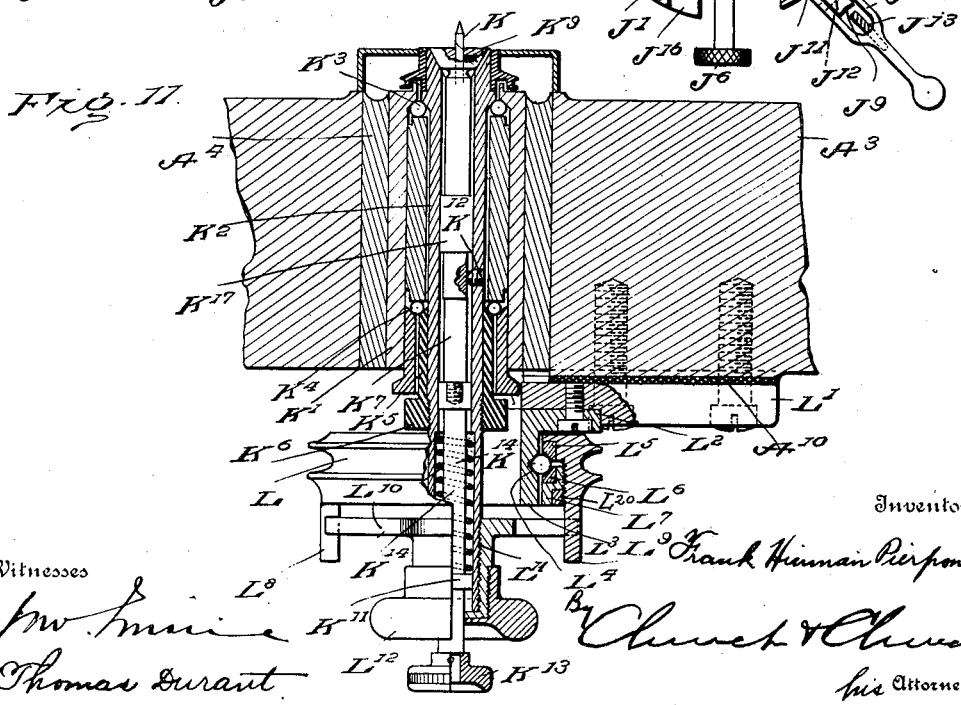

F. H. PIERPONT.
PUNCH CUTTING AND MATRIX CUTTING MACHINE.
APPLICATION FILED JULY 17, 1906.
938,074.
Patented Oct. 26, 1909.
12 SHEETS—SHEET 8.
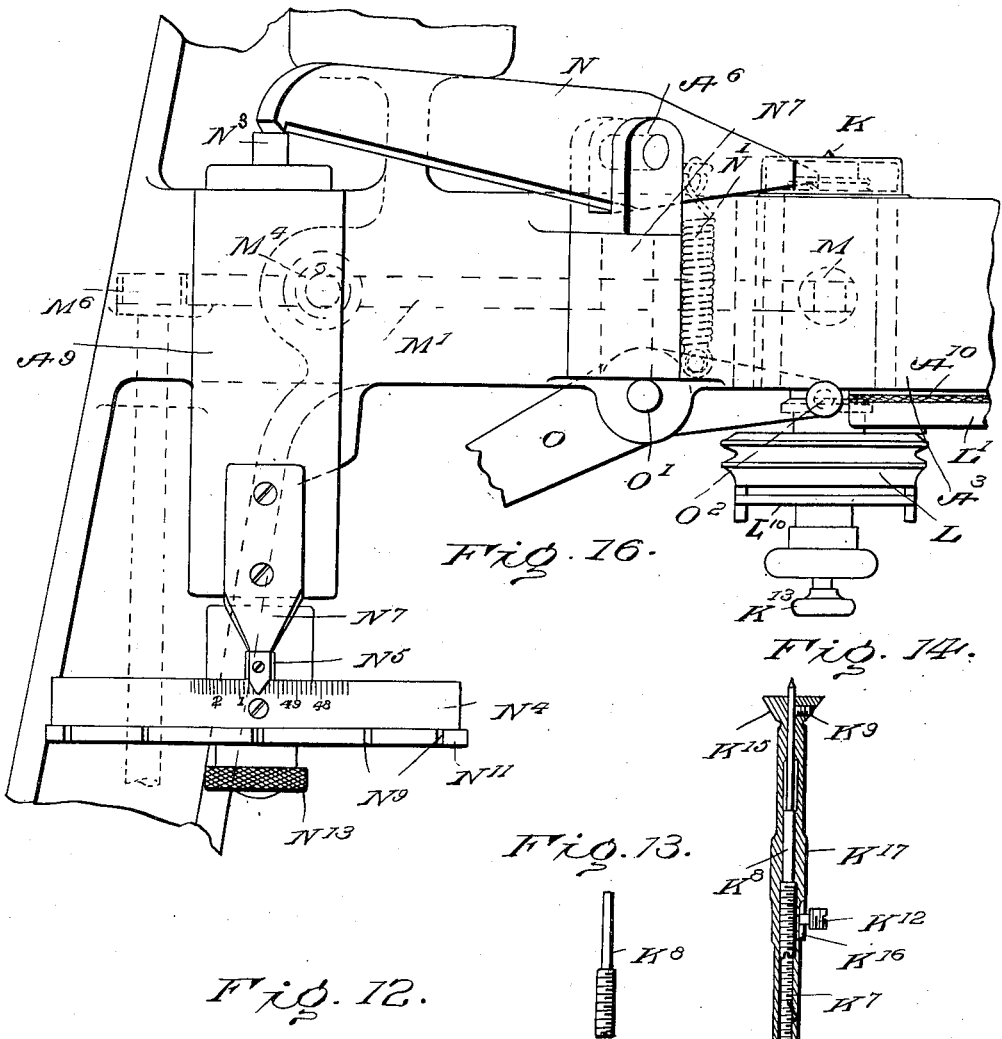
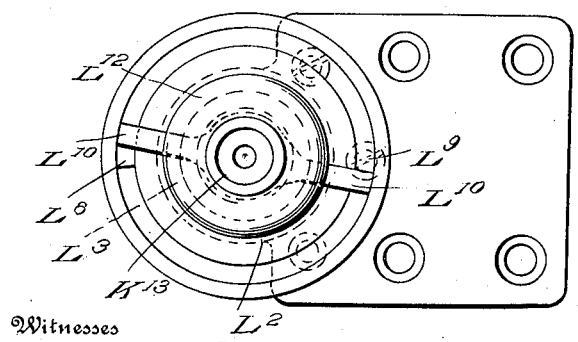

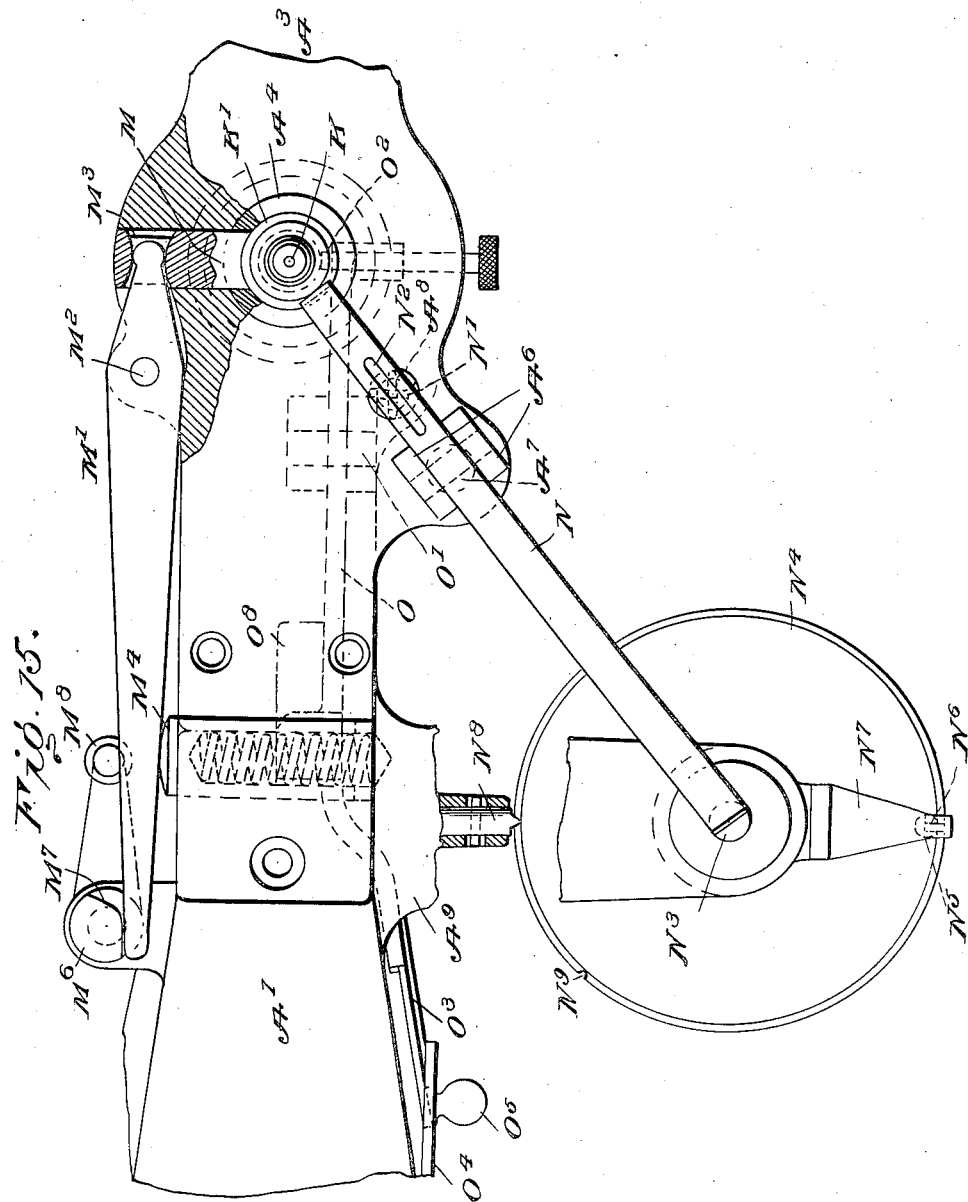

F. H. PIERPONT.
PUNCH CUTTING AND MATRIX CUTTING MACHINE.
APPLICATION FILED JULY 17, 1906.
938,074.
Patented Oct. 26, 1909.
12 SHEETS—SHEET 10.
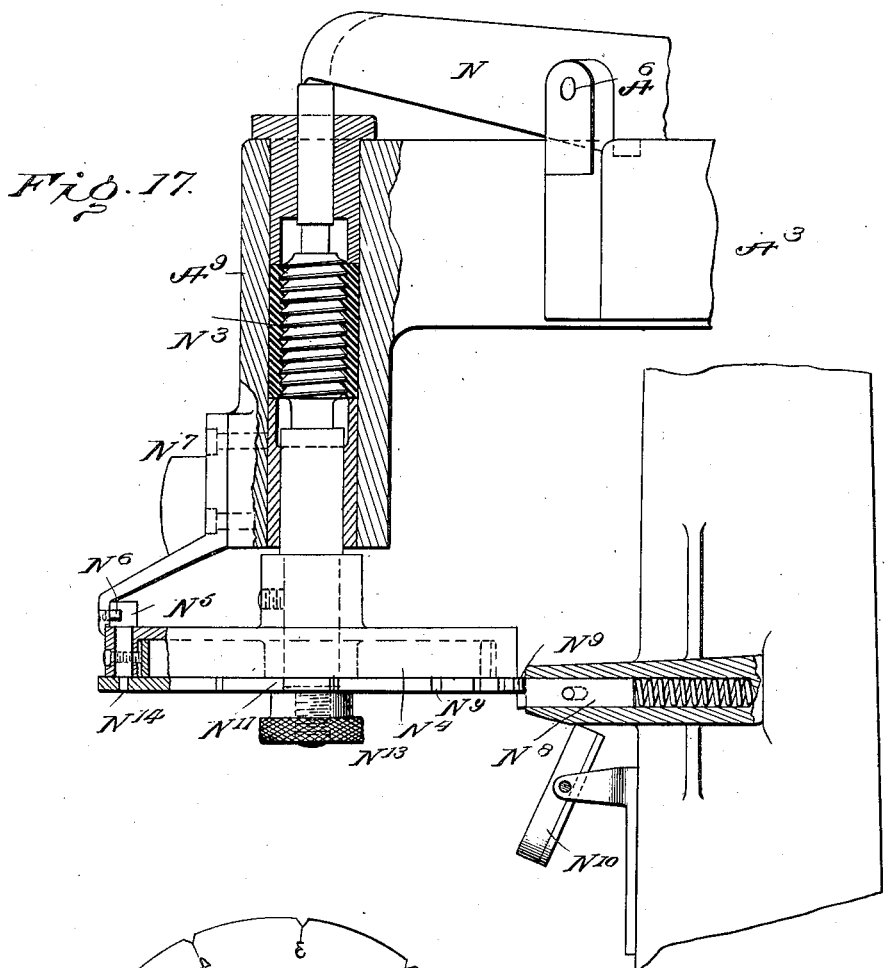
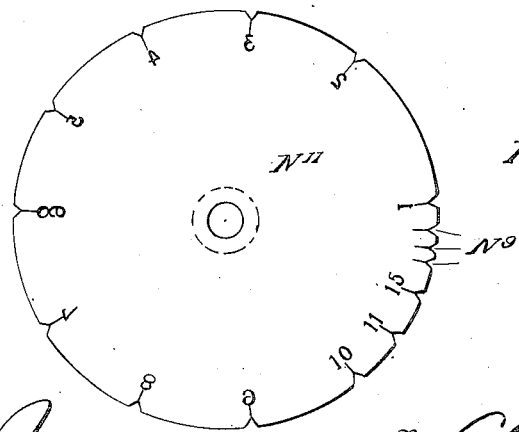
Witnesses
Inventor
Frank Hinman Pierpont
By Church & Church
his Attorneys

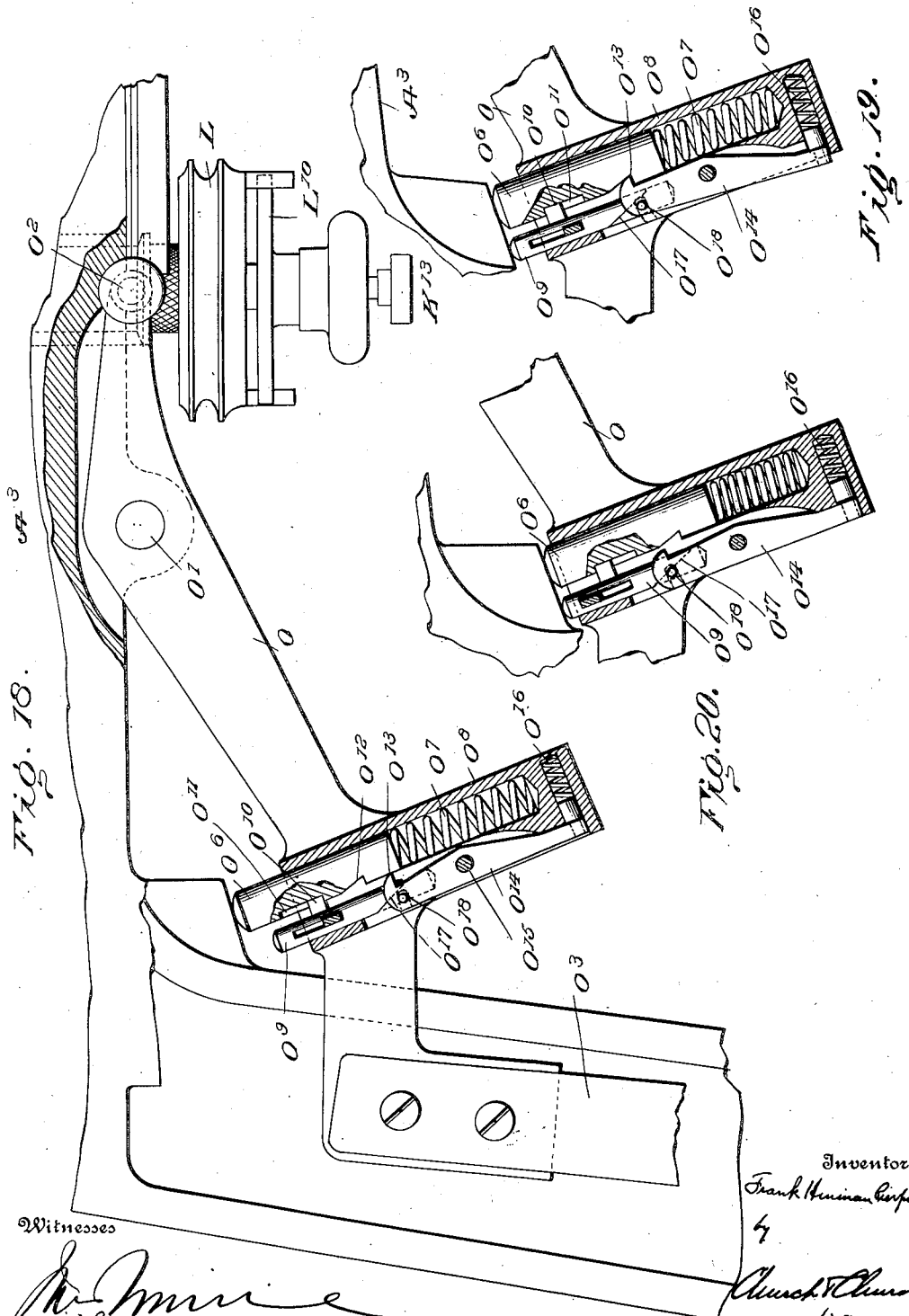

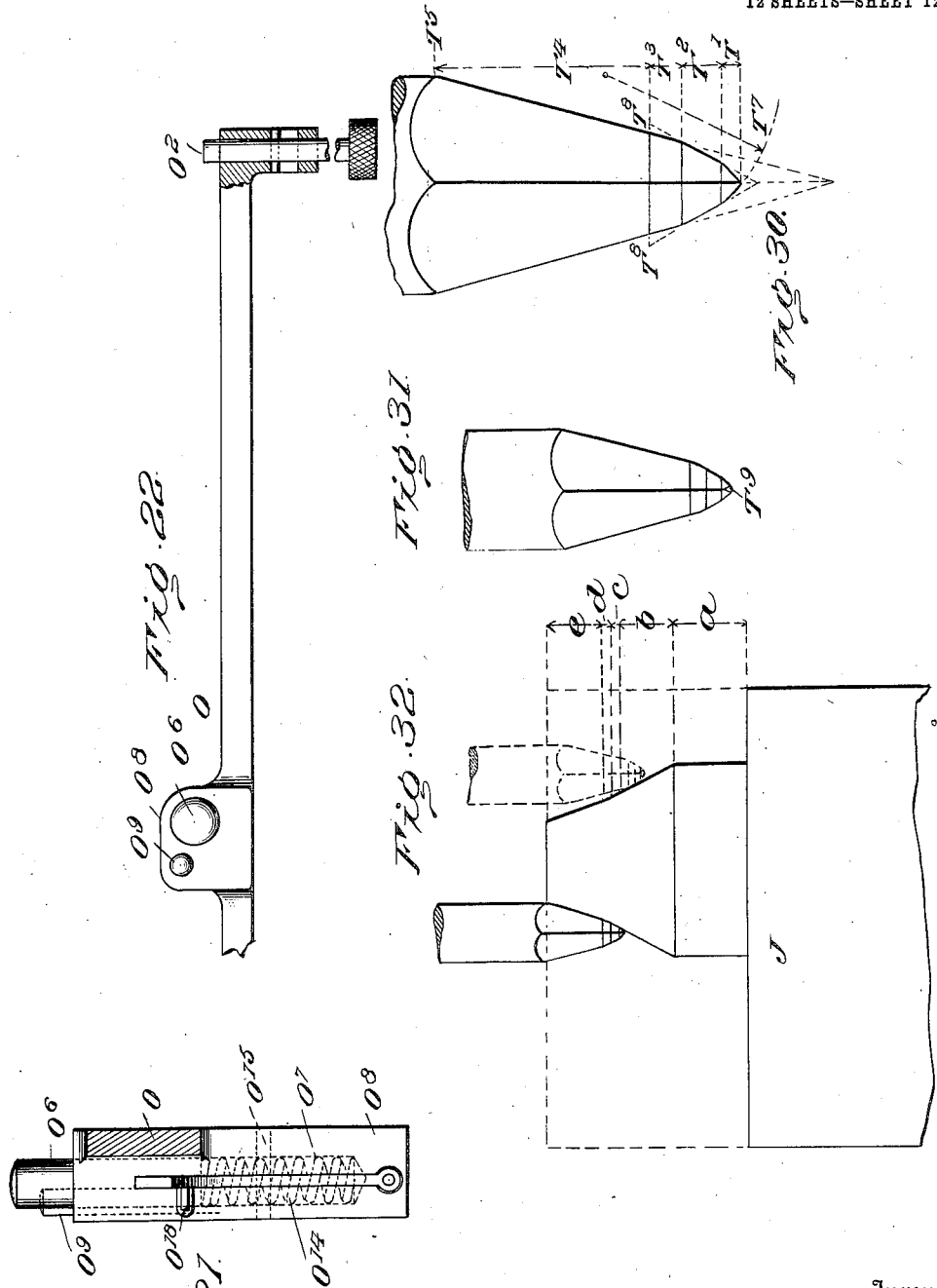

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

PUNCH-CUTTING AND MATRIX-CUTTING MACHINE.

938,074.     Specification of Letters Patent.     Patented Oct. 26, 1909.

Application filed July 17, 1906. Serial No. 326,571.

To all whom it may concern:

Be it known that I, FRANK HINMAN PIERPONT, a citizen of the United States, temporarily residing at Horley, in the county of Surrey, England, do hereby declare that I have made a new and useful Improvement in or Relating to Punch-Cutting and Matrix-Cutting Machines; and I do hereby declare the following to be a full, clear, and exact description of the same, reference being had to the accompanying drawings, forming a part of this specification, and to the figures and letters of reference marked thereon.

This invention relates to machines for reproducing in cameo or in intaglio pattern designs and more particularly to machines of this class for cutting type, type punches, matrices and the like where extreme accuracy in proportion, location and form are essential requisites, although many features of the invention may be otherwise utilized.

Heretofore the cutting of type punches and matrices has been regarded as an art demanding the exercise of the highest degree of mechanical skill even when practiced by the aid of the most approved forms of mechanism to be found in the market. This is due in a large measure to the extreme degree of accuracy demanded, the measurements running into ten-thousandths of an inch and less, and to latent and patent inaccuracies in the mechanism employed to effect the reproduction, necessitating frequent inspections and measurements of the product during development and the readjustment of the working parts to correct observed inaccuracies or compensate for known deficiencies, the latter usually charted and allowed for in setting the adjusting devices. Not only is a high degree of skill required in making these observations and effecting corrective and other adjustments, but much valuable time is lost thereby, not infrequently exceeding 50% of the time actually consumed in cutting the punch, resulting not only in increased cost but a corresponding reduction in output.

Now, one of the principal objects of the present invention, and one which has been successfully demonstrated in practice is the elimination of latent and correction of patent errors in the mechanism itself to such an extent that an amateur or unskilled operator of average intelligence can, by the aid of said machine, not only produce accurate and perfect punches and matrices equal or superior in all respects to those heretofore produced by skilled labor but at a rate far in excess of that heretofore attained.

To this end the invention consists in the construction combination and arrangement of parts hereinafter described including, among others, the following novel features, to wit: the employment of a spherical joint located in the cutting axis of the machine for transmitting motion from the pantograph or tracing lever to the work or tool support in a predetermined ratio and without undue displacement arising from multiple connections and more or less loose joints; insuring the correct location of the patterns with relation to the cutting axis of the machine by providing each pattern with an index or notch in predetermined relation to one side of the character borne thereby and the bed plate or platen with interchangeable gaging members for maintaining a constant margin along one side of each punch or matrix irrespective of the degree of reduction for which the machine is set; providing the cut controlling devices with an index plate and a graduated series of followers or disks, said index plate carrying a graduated series of notches or equivalent mechanical locating members corresponding with a predetermined ratio of reduction, each locating member being numbered or otherwise marked to indicate the corresponding follower (there being a separate index plate and corresponding series of followers for different ratios of reduction) whereby precise adjustments can be quickly and accurately effected, thereby dispensing with charts and eliminating a prolific source of personal error; insulating the cut controlling adjusting devices from the cutter and blank, as by locating them at a remote point and employing knife edge or equivalent line or point transmission contacts, so that the heat generated in the cutting operation will not be transmitted to and caused to effect the accuracy of the adjustments; insulating the bearing for driver or pulley from the cutter carrying spindle and its support so that the heat generated by the rotation of said pulley will not be transmitted to and effect said spindle, its support or the cut controlling adjusting devices; advancing the cutter relative to the work or blank by spring pressure and limiting the advance by a micrometer gage, to determine the depth of cut; retaining the removable cutter carrying quill in its bearing and the tool holder in its spindle by spring pressure, thereby preventing distortion due to varying pressures produced when positive clamping devices are employed as well as permitting expansion in a direction away from the cutting axis of the machine; locating the cutting spindle in the axis of the machine and supporting it from opposite sides of the frame so that variations in temperature will not operate to displace said cutter; supporting the trunnion bridge or gimbal joint support for the pantograph or tracing lever at points near the cutting axis with opposite ends of said bridge secured in sliding connection with the frame, so that expansion and contraction due to variations in temperature may be compensated for without disturbing the relation between the cutter and blank; providing a simple and readily separable joint between the followers and the stylus or tracing end of the pantograph, of a character to prevent shake or lost motion, to permit rotation of the engaged follower or disk, and to maintain constant, in relation to the disk, the center of oscillation of the lever as its angular position is varied; providing a holder for the followers so disposed in relation to the platen or table and pattern, that the followers may be removed and returned by the stylus; providing one of the two crossed axes of the universal joint supporting the pantograph or tracing lever with micrometer adjusting screw of such pitch that the graduations of the scale employed read in units of the standard of measurement of the reduction or enlargement it regulates, to enable relative adjustments of said crossed axes to be quickly and accurately performed when setting the machine to vary one dimension of the ratio between the pattern and design to be cut; and the employment, in connection with the tracing lever and means for transmitting its motion to the work holder or cutter, of an adjusting device for varying the ratio of reduction compared with the pattern, the same including an adjusting device, such as a screw and nut, adapted to furnish direct readings on a scale in units of the standard of measurements adopted for the finished punches or matrices.

The invention is intended more especially to provide a machine to make the steel punches used in the manufacture of type casting matrices. A convenient and preferred construction of a machine for this purpose embodying the invention will now be described by way of example with reference to the accompanying drawings, of which:

Figure 1 is a plan of the machine, Fig. 2 is a front elevation, and Fig. 3 is a side elevation with parts removed looking at the right hand of an observer of Figs. 1 and 2. Fig. 4 is a plan of the bed plate of the machine, Fig. 5 is a side elevation with parts in section of the upper part of the machine, Fig. 6 is a front view, Fig. 7 is a side view, each with parts in section, and Fig. 8 is a plan of the supporting and guiding members for the blank-holder, Fig. 9 is a perspective view of the blank-holder detached, and Fig. 10 is a top view of the said holder in position, Fig. 11 is a vertical cross section, part in elevation, of the tool holder and its driving means. Fig. 12 is a bottom plan of the same, Figs. 13 and 14 are details of parts of the said holder, Fig. 15 is a plan, and Fig. 16 is an elevation of the levers for controlling the position of the tool holder, Fig. 17 is a side view partly in section of the micrometer screw controlling one of said levers, and Fig. 17$^a$ is a plan of the micrometer screw index-disk detached. Figs. 18, 19, 20, 21 and 22 are details relating to one of said levers. Figs. 23, 24, and 25, are views of the followers carried by the stylus. Figs. 26 and 27 are a plan and side view respectively, of tee square for use with the stylus, Fig. 28 is a sectional view of the follower carrier-table, Fig. 29 is a perspective view of the stylus, or end of the tracing arm of the pantograph lever, Fig. 30 is a view on a greatly enlarged scale of a preferred form of tool, Fig. 31 is a view of another form of tool, and Fig. 32 is a diagrammatic view to illustrate the manner of employing these tools.

Like reference signs indicate like parts in all the figures.

The frame of the machine comprises a bed plate A and a vertical standard bolted thereon, having two legs $A^1$ $A^2$ connected near the top by a cross bar $A^3$.

Placed centrally in the bed plate, in a recess extending from front to back thereof, is an adjustable table C, secured to the bed plate by two studs $C^1$ having milled heads so as to be turned by the operator without a tool, the studs passing through slots $C^2$ in the base plate to permit of adjustment of the table from front to back of the machine. The table is normally set in position for cutting standard punches, but requires to be adjusted, should it be desired to cut a punch located eccentrically on the punch body. A vernier scale $C^3$ is provided so that the desired eccentricity can be definitely allowed for.

A hole $C^4$ is provided in the center of the table to receive for purposes of adjustment the end or stylus $B^1$ of a pendent arm B of the operating or pantograph lever.

When the machine is in operation a pattern D is located centrally on the table, as shown in Fig. 4, and to position the pattern on the table and hold it in position three slides are provided; a slide $C^5$ in front of the pattern and two slides C⁶ one on each side thereof. The rear wall of the opening in which the slides work furnishes a fixed gaging surface for line measurement. The face of the slide C⁵ adjacent to the pattern is formed with a dovetailed slot to receive a removable gage or plate C⁷ having an angular projection C⁸ adapted to engage a similarly shaped notch D¹ on the pattern D, so that by engaging the projection in the notch on the pattern, the pattern is automatically placed in correct position sidewise on the table. The plate C⁷ is made removable and a plurality of plates provided, with projections variously located thereon, to enable the same pattern, with but one notch thereon, to be correctly positioned sidewise on the table, to cut punches of different sizes, for instance, for minion, brevier or pica, with the character properly located on the blank, that is in a definite position relative to one side of said blank.

Inasmuch as it is desirable that the shoulder or interval between the reduced end of the blank and one side of the latter should be uniform irrespective of the size of the punch cut and the amount of reduction, it is clear that if but one plate C⁷ were provided this could not be accomplished as the shoulder would vary in width proportional to the reduction and the character be wrongly positioned on the punch blank.

The slide C⁵ which has only a limited range of movement is pushed into position by hand and readily locked by means of a handle on a pin C⁹ rotatably carried in the table, and having an eccentric portion C¹⁰ engaged in a lug C¹¹ projecting from the underside of the slide into a recess in the table.

Each slide C⁶ is providtd with a stud C¹² on its underside projecting downwardly through a slot C¹³ in the table, arranged to permit of sidewise adjustment of the slide thereon, each stud having a butterfly nut so that the operator can readily release or clamp the slide as desired.

A groove C¹⁴ may be provided on one side of the surface of the table adapted to receive the end D⁵ of a tee square D³ having a handle D⁴ (see Figs. 26 and 27). The use of this tee square will be hereinafter explained when the operation of the machine is described.

The bed plate A is formed with a projecting lug at the back of the pattern adjusting table having a boss bored to receive the pivot E⁶ (Figs. 3, 4 and 28) of a follower carrier-table E¹ mounted thereon and hereinafter more fully described.

The operating or pantograph lever comprises the pendent arm B, already referred to, and a cross-arm B².

The lower portion of the arm B is preferably formed as a hollow tube B¹⁹ in which is engaged a telescoping portion B²¹, normally tending to be pushed downwardly by a spring B²⁰, as shown in Fig. 2. The telescoping portion B²¹ terminating in the stylus B¹ before referred to, which is preferably ball-ended, as shown clearly in Fig. 29.

When the pointed end B¹ of the arm B is placed in the hole C⁴ of the table, the arm extends upwardly and backwardly to above the top of the frame standard, where it is formed integral with the cross-arm B², extending horizontally across the machine from back to front, and supported at each end on a trunnion B³, these trunnions being carried in opposite ends of a yoke G, itself carried by trunnions G¹ in lugs G² on a bridge or cross-piece G³ hereinafter called the trunnion bridge, secured by studs G⁴ onto the top of the standards A¹ A². Preferably the trunnioned bridge is provided at each end with a tongue which fits into a corresponding groove in the end of each standard leg, the studs G⁴ holding the bridge down in spring pressure so as to allow it to expand or contract with variations of temperature. The central portion of the bridge is held rigidly in position by studs G⁶ which fix it to a cross-plate H² as hereinafter described. All four trunnions are normally in the same plane, but preferably, as shown in the figures and hereinafter fully described, the support for the trunnions B³ in the yoke G are made adjustable for a purpose hereinafter described.

The arm B is desirably made as light as is compatible with the rigidity required. As a convenient construction, combining lightness with rigidity, the arm may be provided with stays R² secured to the lower portion of the arm and to the ends of a bracket R, bolted to a lug on the cross-arm B², as shown in Figs. 1, 2 and 3.

The trunnion bridge G³ is formed with a central opening or ring, having two oppositely placed pendent ears G⁵ secured by studs G⁶ to a cross-plate H², and the ends of the latter are fixed by studs to projections on the standards below the trunnion bridge, the cross plate and the bridge forming together a firm and rigid support for two slide plates H H¹, which give movement and direction to the punch to be cut, the holder for said punch being carried by one of said slides as will presently appear. By thus securing the central portion of the bridge G³ supporting the tracing lever directly to the cross-plate H² upon which the slide plates H H¹ are mounted and connecting opposite ends of said bridge to the frame by slip joints, not only is the structure rendered more rigid and less liable to spring under working conditions, but lateral displacement of the tracing lever relative to the cutting axis of the machine and consequent variation in the movements communicated to plates H H¹ are avoided.

The lower slide-plate H¹ is supported and guided upon the slide cross-plate H², as best shown in Figs. 7 and 8, two slide ways being provided opposite to each other. Preferably each slide way comprises two face pieces H³, of hardened steel, secured by studs in a groove in the cross plate and contacting with a face piece H⁴, also of hardened steel, fixed on the slide plate H¹, and with a guide piece H⁴ˣ between them thus constraining the slide plate to move along one straight line in a horizontal plane. The face piece H⁴ projects slightly beyond the surface of the slide plate H¹, so that the surfaces of the slide-plate and cross-plate are not in rubbing contact.

The upper slide-plate H is formed as a square plate with a central circular boss, extending upwardly through the opening in the trunnion bridge G³ and downwardly through openings in the lower slide plate H¹ and the cross plate H², as shown best in Fig. 5. The upper slide-plate is supported on the lower slide-plate and guided by slide ways H⁵ similarly arranged to those just before described, as shown best in Figs. 6 and 8, the face pieces being arranged so that the faces of the two slide plates are not in rubbing contact, the slide ways H⁵ constraining the upper slide plate to move at right angles to the path of movement of the lower slide plate and in a plane parallel therewith. A projection or bearing H⁶ is formed on the under face of the lower slide plate H¹ below each slide way to take the weight of the upper slide plate.

To hold the slide ways of the two slide plates and the cross plate in working contact a bottom plate H⁷ is provided; screwed, as shown in Figs. 5 and 6, up to a shoulder on the boss of the upper slide-plate below the cross plate H². To adjust the degree of contact of the horizontal bearing faces of the slide ways and to assist in relieving the lower slide plate of the weight of the upper slide plate, the bottom plate H⁷ is provided with four adjustable bearing pieces H⁸ preferably of hardened steel, one at each corner, which contact with corresponding bearing pieces H⁹ fast in the cross plate H². The pieces H⁹ extend through the cross plate and contact with bearing pieces H¹⁰ in the upper slide plate H, these pieces extending down through suitable openings provided in the lower slide plate H¹. The pieces H⁹, H¹⁰ are provided with a central hole H¹¹ which acts as an oil duct for the bearing surfaces (see Figs. 6, 7 and 8.) As thus arranged slide plate H H¹ receive independent support from cross plate H² and at the same time are constrained to move in parallel planes.

The upper portion of the boss of the upper slide plate H is bored out centrally to form a chamber H¹² (Fig. 5) to receive the universal joint or connection between the slide plates and cross-arm B² of the pantograph lever. This connection includes a ball B⁴ on the end of a short rod B⁵, which rod passes up through a boss formed centrally on the cross-arm B² of the lever B. Preferably, as shown in Fig. 5, a bushing B⁶ is provided in said boss to form the bearing for the rod.

The ball B⁴ works in bearing pieces B⁷, carried in a sleeve B⁸, in the chamber H¹², the sleeve occupying only a portion of the depth of the chamber and being adapted to slide up and down therein. The bearing pieces are adjustably held in the sleeve by a screw-threaded washer B⁹.

It is evident that the extent of any movement given to the slides by a given movement of the lever pendent arm B will depend on the distance at which the ball B⁴ is positioned below the fulcrum of said arm, that is the trunnions B³ G¹. To permit of varying the ratio of the movements of the slides and the arm, means are provided for setting the bearing of the ball B⁴ in any desired position in the chamber H¹² and locking it in such position when set. A preferred construction is shown in the figures, see more particularly Figs. 5, 6 and 8.

The boss of the cross piece B² is externally screw-threaded as at B¹⁰, and an internally threaded nut or ring B¹¹ provided to work thereon. Secured rigidly on the upper end of the rod B⁵, say by a screw nut B¹³ is a cap B¹², of which the bottom edge is adapted to rest on the ring B¹¹.

A bar B¹⁴, Fig. 2, is fixed on the cross piece B² adjacent to the ring B¹¹, and provided with a scale and the ring is provided with an angular projection B¹⁵, also provided with a scale to act as a scale pointer, the scales indicating the ratio of movement given to the slide plates according to the position of the ring.

The screw B¹⁰ is so proportioned that the nut or ring B¹¹ affords for the reduction ratio direct readings on the scale of B¹⁴ in units which are those of the standard of measurement adapted for the finished punches or matrices. Thus in practice the parts are so proportioned that when ring B¹¹ is set to register with the zero mark on scale B¹⁴ the ratio of reduction as between the pattern end of the tracing lever and the slides H H¹ controlled thereby is as 25 to 1, and the scale is marked in both directions in units of .0001 of an inch, so that if the punch called for measures say .1277 the nut or ring B¹¹ is turned until it registers with the corresponding degree upon the scale.

By adjusting the ring on the boss according to the scale and allowing the cap to rest thereon the ball B⁴ can be readily set by the operator to obtain any desired ratio of movement of the blank relatively to the movement of the pendent arm within the limits of adjustment permitted by the machine.

To lock the ball bearing in position when set, a suitable clamping device is provided, the preferred form shown in Figs. 6 and 8, comprising a pin $B^{16}$ having an eccentric portion $B^{17}$, the pin is mounted in a hole bored in the boss of the upper slide-plate H, so that the hole opens into the chamber $H^2$ except that portion holding the eccentric portion of the pin, which extends below said chamber. A handle $B^{18}$ is provided to enable the operator to partially rotate the pin and clamp the ball bearing within the chamber. When the ball bearing has been positioned and locked the ring $B^{11}$ is placed out of contact with the cap $B^{12}$ so that rod $B^5$ is free to reciprocate longitudinally in its bearing in arm $B^2$ of lever B as the latter swings on its pivots.

The described means for transmitting motion from the tracing lever to the slides, including the spherical joint and its radial connection with the tracing lever, possesses many advantages tending to preserve and maintain accurate relationship between the tracer and the blank or cutter carried by or coupled with the slides, reducing the number of joints to two, both located in alinement with the axis of the tracing lever and provided with extended bearing surfaces, at the same time affording opportunity for varying the leverage or ratio of reduction by a single adjusting device, to wit, ring $B^{11}$.

It is necessary that the blank whose movements and position are determined by the tracing lever should occupy a central or predetermined position relative to the axis of said lever, and that such positioning may be automatically effected without special adjustments being made each time the work is inserted the following arrangement has been adopted. A blank holder $J^1$ Figs. 9 and 10 is equipped with a socket or recess, preferably rectangular in cross section and closed at one end to form a seat or end bearing for the blank. The blank J has at least two adjacent sides shaped to correspond with one angle of the socket and is held firmly in said angle by the frictional contact of a pin $J^2$ and adjusting screw $J^3$.

The holder is carried in a recess $J^4$ (Figs. 6 and 10) formed in the lower end of the boss of the upper slide-plate H, and is adapted to slide endwise therein, while held from vertical movement relatively thereto by one side of the holder and one side $J^{16}$ of the recess being shaped as part of a dovetail, as shown in Figs. 6, 9 and 10. The holder is positioned endwise in the recess by a flat on the head $J^5$ of a stud positioned in the slide plate to engage one end of the holder. Conveniently the holder may be provided with a handle $J^6$ for convenience in handling by the operator, as it is desirable that the holder may be readily removed from or placed in operative position.

To lock the holder in position in the recess $J^4$, a catch is provided. A preferred construction is shown in Figs. 6, 7 and 10, comprising a bolt $J^7$, positioned obliquely and forming an easy working fit in a hole in a wall of the recess $J^4$. One end of the bolt $J^7$ when in its uppermost position, is adapted to engage in a hole $J^8$ in the holder, but owing to its oblique position it is normally held free thereof by gravity, the other end of the bolt when in this position resting on a flat spring $J^9$. To place the bolt in locking position a forked arm $J^{10}$, provided with a handle, is pivoted at $J^{11}$ in a recess in the slide plate so as to straddle the spring $J^9$. The arm $J^{10}$ has a cross roil $J^{12}$ in its fork adapted to engage the flat spring and press it forwardly to place the bolt in locking position when the arm $J^{10}$ is in a raised position, as shown in Figs. 2 and 10, the cross roll being free of the spring, allowing the bolt to return to inoperative position, when the arm is in its lowered position, as shown in Figs. 6 and 7. To hold the arm $J^{10}$ in its raised or locking position a catch $J^{13}$ is provided which engages the end of the arm fork when the arm is in its raised position. The catch is pivoted at $J^{14}$ in a bracket on the underside of the bottom plate $H^7$, and controlled by a spring $J^{15}$. To lock the holder $J^1$ in position, the operator has only to raise the arm $J^{10}$ which pushes back the catch against the tension of the spring $J^{15}$ until the end of the fork has passed the notch of the catch, when the spring pushing the catch forward locks the arm. To unlock the bolt, the operator has only to push back the catch and the arm falls by gravity, releasing the flat spring $J^9$ whereupon the bolt $J^7$ drops out of position.

As shown in the figures, the spring bolt $J^7$ is so arranged that when in operative position, it presses the holder simultaneously against the three fixed portions of its carrier viz:—the pin $J^5$, the upper wall $J^{17}$, of the recess $J^4$, and the oblique wall $J^{16}$ of said recess. The cutting is performed by a rotary tool fixed in a holder the latter detachably applied to a hollow spindle mounted to rotate in a holder or quill detachably mounted in the frame.

The quill or holder for the cutting tool K is carried in a vertical hole formed centrally in the standard cross-piece $A^3$, the hole preferably being bushed, as shown at $A^4$, Fig. 11. It is necessary for the quill to be so arranged that the tool may be rapidly rotated approximately from 5000 to 6000 revolutions per minute and also readily adjusted endwise and removable to give varying depths of cut and for the purpose of changing the tool. A preferred construction is as follows:

Referring more particularly to Figs. 11 to 14, the quill comprises an outer sleeve $K^1$ capable of endwise movement in the bushing $A^4$. A hollow revolving spindle $K^2$ is carried within the sleeve on two ball bearings $K^3$ $K^4$ respectively, adjustable by means of a sleeve $K^5$, the position of which is controlled by the milled nut $K^6$, screwed on to a reduced portion of the spindle $K^2$.

Carried within the revolving spindle $K^2$ is a tool-holder $K^7$ in which the tool is held, shown detached in Fig. 14. The upper part of the tool-holder is bored out to receive the tool the lower part of the hole being enlarged and screw-threaded to receive a positioning piece $K^8$ (shown detached in Fig. 13). The tool is placed in the holder resting on the positioning piece $K^8$ and is secured therein and held from turning by means of a set screw $K^9$.

The upper end of the holder is flared out in a cone shape, as shown at $K^{15}$, being adapted to fit into a corresponding conical surface on the end of the spindle $K^2$, while its lower end is screw-threaded to engage in a member $K^{14}$, contained within and projecting beyond the lower end of the spindle $K^2$. By means of this member the holder is positioned in the quill under spring pressure, the cone $K^{15}$ of the holder being held in contact with the conical surface of the spindle by a spring $K^{10}$, held between a collar $K^{11}$ on the member $K^{14}$ and the end of an enlarged portion of the spindle bore within which the spring is positioned.

The tool holder does not engage the bore of the spindle throughout its length, but is provided with a cylindrical bearing surface $K^{17}$ projecting from the holder at a point remote from the cone, as shown clearly in Figs. 11 and 14. The holder is held from rotation in the spindle as by means of a stud $K^{12}$ screwed in the spindle, while its end engages in a slot $K^{16}$ in the holder. As shown clearly in Fig. 14, while preventing rotation of the holder in the spindle, the slot is so arranged as not to interfere with endwise movement of the spindle in an upward direction, and does not therefore interfere with its removal therefrom. By unscrewing the member $K^{14}$ so as to detach it from the holder (the member being provided with a hand-wheel $K^{13}$ for this purpose), and pressing the member up against the action of its spring, the coned head of the holder is pushed free of the spindle, so as to be readily grasped by the fingers, and the holder can be withdrawn. A series of holders each having its tool in position is provided, as is hereinafter more fully set forth when the operation of the machine is described.

By the construction above described, a holder can be removed from the spindle and replaced therein, or another holder substituted therefor without removal of the spindle from its bearings or disturbance of a constant relation between the cutting portion of each and any tool of the spindle.

The conical head $K^{15}$ of the tool holder and the tool held therein are relatively so proportioned and positioned that the base of the cone is not farther from the tip of the tool K when secured therein than a radius of the cone base, and, as shown in the figures, the apex of the cone is directed away from the tip, so that thrust exerted on the cutting tool serves only to bed the cone more perfectly in its bearing in the spindle.

The spindle $K^2$ is rotated by a pulley L driven from any convenient source of power. A convenient construction and arrangement of parts for mounting the pulley are shown in Figs. 11 and 12.

A plate $L^1$ is secured by screw studs on the underside of the standard cross-piece $A^3$, from which it is insulated by a layer $A^{10}$ of material which is a non-conductor of heat. On to this plate is secured a pulley bracket comprising a segmental plate $L^2$, secured by studs on to the plate $L^1$, supporting a ring $L^3$, through which the lower end of the spindle $K^2$ passes. The outer surface of the ring is provided with a circumferential groove $L^4$, which forms one wall of a ball race, of which the other wall is formed by two rings $L^5$ $L^6$ carried within the body of the pulley L which is hollowed out, as shown in Fig. 11. For purposes of construction and adjustment, the ring $L^6$ is carried in an externally screw-threaded ring $L^7$ screwed into the pulley; a screw-threaded locking ring $L^{20}$ may also be provided as shown. The pulley is provided with two oppositely placed ears $L^8$ $L^9$ adapted to engage a cross-bar $L^{10}$ having a central hollow boss by which it is removably secured on the end of the revolving spindle $K^2$, say by screw threads $L^{11}$. Conveniently the cross-bar boss may be provided with a hand-wheel $L^{12}$.

The orifice of the ring $L^3$ is greater in diameter than the outer sleeve $K^1$ of the quill so that the quill can be readily removed from the machine, without disturbance of the driving devices. By means of the layer $A^{10}$ of non-conducting material placed between the pulley support and the machine frame, heat generated at the support by the pulley will not be transmitted to the cutter-operating spindle or its connected parts.

To prevent the tool-holder rotating in the bushing $A^4$, a bolt M Figs. 15 and 16 is provided to engage the outer surface of the outer sleeve $K^1$ of the quill, the bolt end engaging said sleeve being formed with a concave curve to correspond with the curve of said surface, as shown best in Fig. 15, a hole to receive said bolt being formed in the cross-piece $A^3$ and bushing $A^4$. The bolt M is normally held in frictional contact with the holder by spring pressure, and thus besides preventing the quill from turning, holds the same rigidly against one side of its bearing with a constant pressure. The bolt is adapted to be released at will by the operator; a preferred construction comprises a horizontal lever $M^1$, pivoted at $M^2$, in the cross-piece $A^3$. One end of the lever $M^1$ is engaged in a slot $M^3$ in the bolt M, the other end of the lever being engaged by a pin $M^4$, spring-controlled so as to normally press the head of the bolt M against the sleeve $K^1$. To enable the bolt M to be readily thrown and held out of action when the operator wishes to remove the tool-holder, a vertical rod $M^5$ (see Figs. 2 and 3) is provided having its lower end pivoted to the bed-plate A and its upper end in a lug $A^5$ on the standard $A^1$. Fixed on the upper end of the rod $M^5$, which projects just above the lug, is a nut $M^6$, having a cam surface $M^7$, so shaped that a partial rotation of the rod $M^5$ from the normal position shown in Fig. 15 will rock the lever against the tension of the spring-pin $M^4$ and release the holder, the cam surface being so shaped, as shown in Fig. 15, that the bolt M will remain in inoperative position until the rod $M^5$ is returned by the operator to its normal position. To allow the operator to rotate the rod, an arm with a handle $M^8$ is fixed on the rod just above the bed-plate A adjacent to the pattern-carrying table, as best shown in Fig. 2.

An adjustable stop is provided to fix the position vertically of the tool-holder, to provide for different depths of cut. Preferably this takes the form of a lever, of which one end is in contact with the top of the quill, the position of the lever being controlled by a micrometer screw. The construction illustrated is best shown in Figs. 15, 16 and 17.

A lever N is pivoted, intermediate its ends, between ears $A^6$ on a pin $A^7$ carried in a hole in a lug on the standard cross-bar $A^3$. One end of the lever rests on the top of the outer sleeve $K^1$ of the quill being held in contact therewith by a spring $N^1$. Conveniently the spring is housed in a hole $A^8$ in the standard cross bar, one end of the spring being carried by a pin in a slot $N^2$ in the lever N, while its other end is fastened to the cross-bar. The other end of the lever N rests on the top of a micrometer screw $N^3$ carried in a lug $A^9$ on the standard leg $A^1$. Each end of the lever is shaped so as to have a knife-edged or other line bearing on the quill and the screw respectively, so as to tend to isolate the micrometer from the heat-generating cutter and blank and from the bearings of the tool operating spindle, in order to prevent their heat from affecting its accuracy. Other heat-intercepting constructions may be employed.

The micrometer screw is of known construction and need not be particularly described. Integral with or rigidly secured on the lower end of the screw stem is a graduated drum $N^4$. In the particular machine now being described, only one complete turn of the micrometer screw is required to give the limit of the adjustments required, and the upper side of the drum is provided with a stop $N^5$ which engages a pin $N^6$ on an arm $N^7$ secured by studs on to the lug $A^9$. The readings of the drum are taken from a mark on the front of the index finger $N^7$. The graduations on the drum, however, are only intended to be used when some special punch is to be cut. For standard sizes of punches, or for those of which a number are to be prepared, the following arrangements are preferred, as rendering the operation more automatic and eliminating the chance of personal error by the operator. A disk $N^{11}$, shown detached in Fig. 17$^a$, provided with notches $N^9$ around its periphery, is secured on the end of the micrometer screw beneath the drum in such a manner as to be readily fixed in position thereon and removed therefrom; a convenient arrangement is shown in Fig. 17, in which the disk is secured on the end of the screw stem by a knurled nut $N^{13}$, being located as to position and prevented from turning except with the screw stem by engagement with a pin $N^{14}$ which, as shown in Fig. 17, may be a prolongation of the stop $N^5$. The notches $N^{12}$, which are numbered as shown in Fig. 17$^a$, are adapted to engage with a spring pin $N^8$, carried in the standard leg $A^1$. One of these disks $N^{11}$ is prepared for each standard size of punch, and the notches, when engaged with the pin $N^8$ indicate the successive positions required to be given to the micrometer screw to rightly position the cutter for the various cuts or stages in shaping the punch.

To enable the operator while placed in convenient position for manipulating the machine, to readily read the scale on the under side of the disk, a mirror $N^{10}$ is provided, fixed, as shown in Figs. 3 and 17, on the standard $A^1$, the numbers being reversed, as shown in Fig. 17$^a$, so as to appear in normal position in the mirror.

Means are provided to hold up the quill against the tension of the spring $N^1$, so that the end of the lever N is in contact with the head of the micrometer screw when the tool has completed a cut.

A preferred construction comprises what may be called a countering lever O pivoted at $O^1$, (Figs. 15, 16 and 18 to 22), intermediate of its ends, in a slot in the standard cross-bar. In one end of the lever is a pin $O^2$, with a milled head, for purposes of manipulation, the end of the pin engaging the bottom of the quill $K^1$ tending to raise the same against the tension of the micrometer-lever spring $N^1$. The other end of the lever is fixed to an arm $O^3$, Fig. 2, which passes down in front of the standard leg $A^1$, to near the base plate A, where it is held in frictional contact with a bar $O^4$ fixed on the standard leg. The arm is provided with a handle $O^5$ for manipulation purposes. The lever O is provided, intermediate its pivot and the arm $O^3$, with a pin $O^6$, controlled by the tension of a spring $O^7$ to cause the lever to normally put upward pressure on the quill sufficient to overcome the tension of the micrometer-screw lever spring $N^1$. Since it is desirable that the lever should be readily adjustable to relieve the quill of such pressure, a catch is provided for the pin $O^6$ to hold the pin against the tension of its spring when the lever is placed out of operative position. A preferred construction is shown in Figs. 18, 19, 20 and 21. The pin $O^6$ and its spring are housed in a lug $O^8$ on the lever O. The pin is provided with a notch $O^{12}$ with which the nose $O^{13}$ of a catch lever $O^{14}$, pivoted at $O^{15}$ in a slot in the lug, is adapted to engage by the tension of a spring $O^{16}$, as shown in Fig. 19, the slot and catch-nose being so positioned as to be in engagement when the lever is in inoperative position, as shown in that Fig. 19.

To release the pin $O^6$ when it is desired to replace the lever in operative position, a short pin $O^9$ is seated in the lug so as to move endwise therein, and provided with a pin $O^{10}$ engaged in a slot $O^{11}$ in the spring pin $O^6$. The pin $O^9$ has an inclined cam surface $O^{17}$ in engagement with a pin $O^{18}$ on the catch lever.

When the lever is in operative position, as shown in Figs. 2 and 18, the pin $O^2$ being engaged with the sleeve $K^1$ holding the quill in raised position with the ends of the lever N engaged respectively with the micrometer screw and the top of the quill, the pin $O^6$ is engaged with the frame of the machine, the catch $O^{13}$ being below the notch $O^{12}$, and the arm $O^3$ in position, as shown in Fig. 2. If now the operator desires to release the quill, he moves the arm $O^3$ toward the left to the median position marked on the bar $O^4$, thereby pressing down the pin $O^6$ into the position shown in Fig. 19, when the catch $O^{13}$ engaging the notch $O^{12}$, the spring $O^7$ is rendered inoperative and the lever O remains in inoperative position.

To release the pin when the lever O is again put into operative position, the operator moves the arm $O^3$ still farther toward the left (looking at Fig. 2) bringing the pin $O^6$ into the position shown in Fig. 20. During this latter movement the pin $O^9$ is also pressed down, so that its cam surface $O^{17}$ engaging the lever pin $O^{18}$ pulls back the catch and releases the pin $O^6$. On moving the arm $O^3$ now toward the right the pin $O^6$ under the influence of its spring returns to operative position. Owing to the relative position of the pin $O^{10}$ and a slot $O^{11}$, as shown in the figures, the pin $O^9$ does not move upwardly until the notch $O^{12}$ of the pin $O^6$ has passed the catch $O^{13}$.

By means of the lever M, arm $M^3$ and handle $M^8$, the quill can be readily adjusted and locked from the level of the platen in the immediate vicinity of the pattern, while the lever O, arm $O^3$ and handle $O^5$ provide means operated from the immediate neighborhood of the pattern for moving the cutter in the direction of the axis of the cutting spindle to or from the work.

From the construction hereinbefore described it is evident that any movement of the stylus $B^1$ of the arm B around the center of the table C will be communicated on a reduced scale to the punch blank J around the rotatable tool, the ratio of said reduction depending on the position of the ball joint $B^4$ relative to the trunnions $B^3$, $G^1$, and that this position can be varied by raising or lowering the ball joint in the chamber $H^{12}$. If, therefore, a pattern, such as D (Fig. 4) be arranged on the table and the stylus $B^1$, moved around it, approaching step by step to the design thereon until it follows the exact outline of said design, each movement will have brought the blank J in the work holder in corresponding contact with the rotating tool, removing cut after cut of metal from its surface until an exact reproduction of the design on the predetermined reduced scale will have been formed thereon. In order to regulate automatically the movements of the arm-point about the pattern at different stages of adjustment to produce the desired taper for a punch, a series of pattern followers are preferably provided formed as disks, and carried centrally on the stylus $B^1$, the periphery of the disks being caused by the operator to follow the outline of the pattern as closely as the size of the disk will allow. One of the disks E is shown detached in Figs. 23 and 24, $E^4$ being the surface applied to the pattern outline and $E^3$ a central boss having a conical hole $E^5$ to receive the ball-ended stylus $B^1$, the conical holes being so shaped and proportioned relatively to the ball end of the stylus that the center of the ball is always in line with the upper surface of the follower. The disks gradually lessen in diameter, as shown in Fig. 4, until the last employed followers of the series become shaped as shown in Fig. 25, comprising a body $E^{15}$ with hole $E^5$ and a dependent point which forms the surface $E^4$ to contact with the pattern outline. This dependent point terminates preferably as a sphere, of which the bottom is flattened, the center of the sphere being on a line with the top edge of the pattern. By this construction the axis of the tracer is at a uniform distance from the edge of the pattern, no matter at what angle the stylus be tipped.

To insure that the operator employs the series of followers in their proper order and to assist him in so doing, the follower carrier-table $E^1$ is provided, pivoted, as hereinbefore described at $E^6$, see Figs. 2, 4 and 28. The table is recessed to receive a circular plate $E^{11}$ rotatable in a boss on the table extending up through a hole formed centrally in the plate, a cover $E^8$ being fixed over the plate by a stud $E^9$ passing through the boss. The plate also has a raised central boss on which rests a second thin plate $E^{10}$ having recesses $E^{12}$ to receive the parts $E^3$ of the followers E while their disks are housed in the space between the two plates, as shown clearly in Figs. 4 and 28. The cover $E^8$ has a portion cut away, as shown in Fig. 4. By this construction the operator can place the stylus $B^1$ in the hole $E^5$ of the follower which is beneath the cut-away portion of the cover, and draw the follower out of the table. After being used, the follower is returned to its place and the plates $E^{10}$ $E^{11}$ comprising the follower holder turned toward the right hand, looking at Fig. 4, bringing the next follower of the series into position for removal. The followers $E^{15}$ have their points $E^4$ passing through holes in the plate $E^{11}$ their bodies $E^{15}$ resting thereon. One side of the opening in the cover may be provided with a knife edge $E^{13}$, under which the followers $E^{15}$ may be brought to facilitate their removal, after use, from the stylus $B^1$.

To enable the operator to readily handle the followers, the table $E^1$ is conveniently so placed, as shown in Fig. 4, that the larger sized followers would not have room to pass around the side of the patterns adjacent thereto. The table is therefore cut away, as shown at $E^2$, Fig. 4, the table being turned to bring this cut-away portion opposite the pattern while such followers are being used. The table may be provided with handles $E^7$.

As before stated, the tool may be rotated by the pulley L from any convenient source of power; preferably an electric motor is employed, a switch S for starting and stopping the same being provided in convenient position for the operator, say on the standard leg $A^1$, as shown in Fig. 2.

For cutting punches to form matrices for type casting, for which the machine hereinbefore described is especially designed, three kinds of tools or cutters are employed, viz. first, a milling tool which may be of known construction and need not be particularly described; second, what is called the chisel tool, shown in Fig. 31, and third, what is called the point tool shown in Fig. 30.

The point tools are formed as a pointed angular pyramid (preferably as shown in the figure with four sides) wherein the intersection of adjacent faces affords an edge that is first a curve ($T^1$) from the point along a convex tip, then a straight incline ($T^2$) at a given angle with the axis (at which angle it has to produce a slant surface in the work) next a second curve ($T^3$) that is the produced first curve, and, finally, a tangent ($T^4$) to the second curve, slanting outward to the base $T^5$ at an angle to the axis less than said given angle.

The tool is formed by grinding a round wire to, say, a four-sided conical point terminating at $T^6$, Fig. 30; the end below the longitudinal section T is then rounded off on a radius $T^7$ such that the sides $T^4$ are tangential to the curve thus formed; part $T^2$ of this rounded portion is then flattened at a given angle to the axis, which angle is more obtuse, as shown by the dotted lines $T^8$, than the angle formed by the sides of the point first ground.

The flats $T^2$ on the curved portion of the tool, are ground at an angle to exactly coincide with the angles to be cut on the work from the root of the punch to its face. This is accomplished by establishing a definite relation between the size of the punch to be cut, the diameters of the follower disks and the precalculated movements of the micrometer screw.

The chisel tools are similar to the point tools with the exception that the two opposite corners of the point are ground away at a more obtuse angle so as to leave flats $T^9$ on the point as shown in Fig. 31.

The method of operating on the punch blank by the tools or cutters is illustrated diagrammatically in Fig. 32. The portion $a$ of the blank J has been shaped by the milling tool; portion $b$ has been cut to the finished size by the chisel and point tools; portion $c$ represents that portion of the punch which has been brought to finished size by the flats $T^2$ on the point tool when in position as shown in the diagram; portion $d$ is a slightly curved ring left by the curved portion $T^3$ of the tool, while portion $e$ has been cut away by the straight conical portion $T^4$ of the tool.

The operation of the machine is as follows:—The punch to be cut having been decided on, the operator provided with the proper pattern, conveniently made of an electrotype, places the stylus $B^1$ of the arm B in the central hole $C^4$ of the table C, and, having unlocked the ball joint $B^4$ by turning the handle $B^{18}$, adjusts the position of said joint in the chamber $H^{12}$, by means of the cap $B^{12}$, ring $B^{11}$, and scale bar $B^{14}$, to give the desired dimensional ratio between the punch and the pattern. He then relocks the joint $B^4$ and screws down the ring from contact with the cap.

Having placed the gage or plate $C^7$ allotted to the size of punch to be cut, in position and positioned the pattern D on the table by engaging its notch D¹ with the angular projection C⁸, the operator locks the pattern on the table by means of the adjustable slides C⁶. The punch blank J is then fixed in the holder J¹ and the holder locked in position in the slide plate H by means of the handle of the catch arm J¹⁰. The series or sets of followers, appropriate to the size of punch to be cut, is placed in the follower table, the largest follower E being in the cover opening E¹⁴.

The control of the lever N is adjusted by means of the micrometer drum N⁴, which is set at zero, or if, as is more usually the case, a notched disk N¹¹ be employed the disk appropriate for the size of punch to be cut is placed in position with the index pin N⁸ in the zero notch. The numbers hereinbefore described as being placed adjacent to the notches, correspond with numbers on the followers, thus indicating to the operator, at a glance, the correct adjustment required of the micrometer screw as each member of the set of followers is used. By this arrangement precise adjustment of the screw and the cut can be effected more readily than when a head graduated to some scale has to be read by the operator and to be adjusted in a manner which affords no check against personal error. Moreover the employment of charts is obviated, which would be necessary adjuncts to the micrometer, one chart for each degree of reduction were a micrometer scale to be employed.

A milling cutter is inserted in the spindle, and the quill is then placed in the machine. The operator then places the lever O in operative position by means of the handle O⁵ of arm O³, thus placing the tool under spring pressure in operative position, and tightens the quill in position by means of the handle M⁸ and finally starts the tool rotating. The operator now places the stylus in a disk E of predetermined size, and moves the follower around the pattern the edge of the follower being caused to follow the lines D² drawn around the pattern, as shown in Fig. 4. To guide the follower along these lines the tee square D³, hereinbefore described, is used. The milling tool is cylindrical or but slightly tapering and projects from the tool holder farther than the chisel and point tools, and by the operation last described the end of the blank is reduced on four sides, thus forming a projection of which the section a, Fig. 32, represents the base. The quill is then removed from the machine, and a chisel tool is inserted in the spindle in place of the milling tool. The quill is replaced in the machine, and the stylus with the largest follower E attached is carried around the pattern, with the micrometer still at zero. The edge of this tool will cut around the projecting portion of the punch blank at a distance say of .05″ from its face, and as the cutting edge of the tool is inclined the resulting projection upon the punch blank will be a conical figure very roughly approximating the form of the character to be cut. The holding pin M of the quill is now released by the movement of the handle M⁸. The micrometer screw is turned until the next notch upon the index disk N¹¹ engages with the index pin N⁸ and the quill is again locked by reversing the movement of the handle M⁸. By this manipulation the point of the cutting tool is withdrawn from the punch body a predetermined amount. The next smaller follower of the series is now placed on the stylus and carried around the pattern. This cut will result in slightly modifying the irregular conical shaped projection on the punch body and the termination of the cone will approach slightly nearer to the form of the character to be cut. The operation is repeated until the first four disks have been carried about the pattern. The quill is then removed from the machine, the chisel tool replaced by a point tool and the quill again positioned in the machine. With this tool in position the stylus is carried around the work with the next smaller follower and so on until all the followers have been carried around the pattern, it being understood that as the followers are used in their order, beginning with the largest and extending to the smallest the micrometer screw is advanced a predetermined amount, indicated by the numbered notches on the disk N¹¹ which correspond with the sizes of the followers being used and the size of the punch which is being cut, so that when the last follower is in position the point of the tool nearly coincides with the end surface of the punch being cut, and its path around the punch exactly coincides with the contour of the letter. The resulting punch having on its face the character desired, gradually widens toward its base, in an irregular shaped cone of predetermined angle to the contour of the punch, gradually expanding and rounding out in such a manner that angles upon the characters themselves merge into curves and of relatively large radius at the base, the function of this machine being to cut a punch of the correct contour upon the face and of smooth inclined surfaces for its sides, this incline resulting from the action of the angular section T² of the cutter Fig. 30 following in action the curved section T³ and thus removing the ridges which would otherwise be formed by the successive application of the curved section at different distances from the face of the punch.

In case the letter is one having a counter such as the opening in the "o, e, a" and so forth, the operation is somewhat modified.

The exterior of the punch is cut as above described. The interior or hollow part of the punch is cut as follows. The follower, of a size that will fit loosely within the recess of the character on the pattern, is placed within this recess. The handle M⁸ is operated to release the holding pressure on the quill, the handle O⁵ is carried to its intermediate position which allows the quill and spindle to recede from the work and from the micrometer lever N a considerable distance. The stylus is then inserted in the conical cavity of the follower which has been placed within the pattern and the handle O⁵ is carried to its extreme left position and then released. The spring O⁷ forces the quill and tool-holder toward the punch, the tool advancing into the punch until the movement of the quill is arrested by the micrometer lever N. The handle M⁸ is then swung around so as to lock the quill. The follower within the cavity of the pattern is carried within the latter. The movements of the levers M⁸ and O⁵ are now reversed so as to cause the cutter to recede from the cavity which it has cut in the end of the punch blank. The next follower in order is inserted and the micrometer adjusted to the notch on the index plate which corresponds to this follower, and the second cut is made around the cavity in the punch blank. This operation is continued until all the followers have been used in the same manner as that described for cutting the external part of the punch.

Besides permitting the operator to predetermine a common dimensional ratio, relatively to the pattern, of all the movements given to the punch blank to enable the same pattern to be used for cutting punches of different sizes, as the machine hereinbefore described allows, it is also desirable that the operator should be able to vary the ratio of a certain set of such movements as compared with the ratio of the remainder, to enable, for example, a pattern having a design of a circular shaped O to be used for cutting a punch with an O of an elliptical shape. For this purpose means are provided to enable the operator to displace laterally one of the cross axes of the fulcrum-joint, that is to shift one of the two cross axes of the universal joint toward and away from the other, and this is done in the machine now being described by making the trunnions B³ supporting the lever B B², adjustable vertically in their bearings in the yoke G. It is desirable that the operator should be able to make any such desired adjustment readily and accurately, and this is done by employing to control the vertical movements of the trunnions, a micrometer screw of such pitch that the graduations of its scale are units of the standard of measurement of the reduction or enlargement to be varied.

The preferred construction is best shown in Fig. 5. Each trunnion B³ is fixed in a block G⁷, slidable vertically in a bearing G⁸ formed on the yoke G, a horizontal hole G¹³ of larger diameter than the trunnion and through which the trunnion passes to engage the lever allowing the trunnion to follow the vertical movements of the block G⁷. The block is adjustable into and held in position by two screw-threaded pins G⁹ G¹¹ screwed into caps G¹² and G¹⁰ respectively, the caps being secured say by screw threads, as shown in the bearing G⁸. The top and bottom of the bearing G⁸ are provided with covers G¹⁴, G¹⁵ respectively, formed integral with or fixed on to the heads of the pins G¹¹ G⁹ respectively, conveniently the bearing G⁸ may be bushed, as shown in Fig. 5. The pin G⁹ is a micrometer screw, and the cap G¹⁵ is graduated in terms of the index B¹⁴, B¹⁵, so that the degree of aberration to be introduced can be readily and accurately determined.

It is advisable that the operator should be able to readily examine the point of the tool with a magnifier after it has completed the cutting of a punch, for if the cutting edges of the tool be intact, it necessarily follows that the cutting of the punch must be correct. In case the tool is found to be dull or broken a new tool is inserted and the cutting movements are repeated. To enable this examination to be readily made, a magnifying device comprising a microscope with a lamp and condensing lenses may be movably mounted on the machine frame so as to be readily brought into use by the operator. A convenient construction is illustrated in Fig. 2, in which a microscope P is carried on a bracket P², pivotally mounted on the standard leg A² so as to be readily placed into position for use (shown in dotted lines) or swung out of the way of the operator (as shown in full lines in the figure): A handle P⁴ may be provided as shown. Clamped on to the microscope at P¹ is a holder for an electric light P⁶ with condensing lenses arranged in a tube P² and so placed as to focus the illumination on the tool when held in the focal plane of the microscope. Although the illumination is at a slight angle to the microscope, the illumination itself is sufficiently parallel for all practical purposes. The wires P⁵ for the lamp are connected to one member P⁹ of a switch, of which the other member P¹⁰ is mounted on the standard leg A², so that the lamp is automatically switched on when the microscope is brought into operative position and turned off when it is placed again out of use.

The specific construction of the cutter, cutter holder and blank holder illustrated is not claimed herein, but the same are reserved in divisional applications filed June 16, 1908, Serial Nos. 438,832; 438,833 and 438,834.

Having thus described my invention, what I claim as new and desire to secure by Letters Patent, is:—

1. In a machine such as described, the combination with a tracing lever pivotally supported on a universal joint and a work support movable in a plane intersecting the path of said lever of a transmitting connection provided with a spherical joint.

2. In a machine such as described the combination of the following elements, to wit: a tracing lever supported upon a gimbal joint; a work support movable in a plane transverse of said lever; and a transmitting connection intermediate said lever and work support provided with a spherical joint located in the cutting axis of the machine.

3. In a punch or matrix cutting machine provided with an oscillatory tracing lever and a work support movable in a plane and in combination therewith a transmitting connection including a ball and socket joint; carried by the work support and an arm or radial extension engaging the tracing lever.

4. In a punch or matrix cutting machine, the combination of the following elements, to wit; a work support movable in a plane; a tracing lever provided with a universal joint support; and means for transmitting the motion of said lever to said work support including a spherical member centrally pivoted on the work support and connected to the tracing lever by a sliding joint or connection.

5. In a punch or matrix cutting machine, the combination of the following elements, to wit; a bed plate; a work holder movable in a plane parallel with said bed plate; a tracing lever supported upon a universal joint to swing in paths intersecting the planes of said bed plate and work holder, and a transmitting connection intermediate said tracing lever and work holder including a spherical joint located on the work holder in the cutting axis of the machine and provided with a radial extension or arm movable longitudinally in a bearing on said tracing lever.

6. In a punch or matrix cutting machine the combination of the following elements, to wit; a rotary cutter supported in fixed bearings; a work support movable in a plane transverse to the axis of said cutter; a bed plate supporting a pattern; a tracing lever movably supported on a universal joint to swing on lines intersecting said pattern and work support; and a connection for transmitting motion from the tracing lever to the work support the same including a spherical joint mounted on the work support in the cutting axis of the machine and provided with a radial arm or extension engaging a bearing on the tracing lever in alinement with the working axis of the latter.

7. In a punch or matrix cutting machine provided with a tracing lever mounted upon a universal joint and a work support movable in a plane intersecting the path of said lever and in combination therewith means for transmitting motion from said lever to said work support provided with adjusting devices whose scale affords direct readings in units of the standard of measurement adopted for the finished punch or matrix.

8. In a punch or matrix cutting machine provided with a tracing lever, a work support movable transversely of the lever, and intermediate transmitting connections and in combination therewith means for adjusting said transmitting connections to vary the ratio of movement between the lever and work support the same including a micrometer screw and scale so proportioned as to afford direct readings in units of the standard of measurement for the punches or matrices.

9. In a punch or matrix cutting machine, the combination of the following elements, to wit; a tracing lever swung on a universal joint; a work support movable transversely of the lever; a transmitting connection intermediate the lever and work support including a spherical member mounted in an adjustable bearing on the work support and provided with a radial arm or projection engaged by the lever.

10. In a punch or matrix cutting machine, the combination of the following elements, to wit; a tracing lever swung on a universal joint; a work support movable in a plane transversely of the lever; a transmitting connection including a spherical member supported in a bearing movable in the work support and provided with an arm engaging the lever; and means for securing said bearing in adjusted position.

11. In a punch or matrix cutting machine provided with a tracing lever and a transversely movable work support and in combination therewith a transmitting device connecting said lever and support and including a bearing carried by said work support and adjustable thereon in a direction transverse to the line of travel of said support and a spherical member engaging said bearing and provided with a radial arm or projection engaging the tracing lever.

12. In a punch or matrix cutting machine the combination of the following elements, to wit; a tracing lever swung on a universal joint; a work support movable in a plane transverse of said lever; a bearing carried by said support and adjustable in a line perpendicular to the plane of movement of the work support; and a spherical member seated in said bearing and provided with a radial arm or projection the latter engaging and movable longitudinally in a bearing on the tracing lever.

13. In a punch or matrix cutting machine, the combination of the following elements, to wit; a tracing lever swung on a universal joint and provided with a bearing or orifice central of and in line with its axis of oscillation; a work support movable in a plane intersecting said lever and provided with an orifice or bearing perpendicular to its plane of motion; a bearing block adjustable in the bearing of the work support and a spherical member engaging said adjustable bearing block and provided with an arm or extension engaging and movable longitudinally within said bearing or orifice in the tracing lever.

14. In a punch or matrix cutting machine, the combination of the following elements, to wit; a tracing lever swung on a universal joint; a work support movable transversely of said lever; a transmitting connection including a spherical member provided with an adjustable bearing on said support and with a radial arm riding in a bearing on the tracing lever; and means for adjusting the bearing of the spherical member on the work support to vary the movement communicated to the latter from the tracing lever.

15. In a punch or matrix cutting machine provided with a tracing lever swung on a universal joint; a work support movable in a plane transverse of and intersecting the path of said lever and a rotary cutter mounted with its axis perpendicular to the plane of movement of said support and in combination therewith a transmitting connection interposed between the lever and work support and including a bearing carried by the work support and adjustable thereon in a line parallel with the axis of the cutter, a spherical member seated in said bearing and provided with a radial arm engaging a bearing on the tracing lever in alinement with the axis of oscillation of said lever.

16. In a punch or matrix cutting machine, the combination of the following elements, to wit; a tracing lever supported to oscillate on a universal joint and provided with a bearing disposed radially to and in a line intersecting the axis of oscillation of said lever; a work support movable transversely of the tracing lever and provided with a bearing adjustable thereon transversely of the path of movement of said support; a spherical member pivotally supported in said bearing and provided with an arm engaging the bearing on the tracing lever; and means for clamping said adjustable bearing in position.

17. In a punch or matrix cutting machine provided with a tracing lever supported to oscillate on a universal joint and a work support movable transversely of said lever and in combination therewith a transmitting connection interposed between said lever and work support including the following elements, to wit; a rod engaging a bearing on the tracing lever and movable longitudinally therein on a line intersecting the axis of oscillation of said lever; a spherical member carried by said rod and engaging a bearing on the work support.

18. In a punch or matrix cutting machine provided with a tracing lever supported to oscillate on a universal joint and a work-support movable in a plane intersecting the path of said lever and in combination therewith an adjustable transmitting connection between said lever and support for varying the ratio between the pattern and product including the following elements, to wit; a bearing on the tracing lever in alinement with its center of oscillation; a rod movable longitudinally in said bearing and provided with a spherical member engaging the work support; and means for adjusting said rod and retaining it in adjusted position.

19. In a punch or matrix cutting machine the combination of the following elements, to wit; a tracing lever supported to oscillate upon a universal joint; a work support movable in a plane intersecting the path of said lever; a rod engaging a bearing on said lever and movable longitudinally therein on the axis of oscillation of said lever and a ball and socket joint connecting the work support and rod whereof one member is adjustably mounted upon the work support and the other carried by said rod.

20. In a punch or matrix cutting machine, the combination with the tracing lever and movable work support of an adjustable transmitting device including the following elements, to wit; a rod pivotally connected to the work support and movable longitudinally in a bearing on the tracing lever in alinement with its axis of oscillation; adjusting means carried by the tracing lever in position to engage a part carried by said bolt; and means for retaining the rod in adjusted position after the withdrawal of said adjusting means.

21. In a punch or matrix cutting machine the combination with the tracing lever and work support of an adjustable transmitting device provided with a scale graduated in units of the standard of measurements adopted for the finished punches or matrices.

22. In a punch or matrix cutting machine provided with an oscillating tracing lever and movable work support and in combination therewith an adjustable transmitting device including the following elements, to wit; a rod pivotally connected to the work support in a manner to permit its axis of oscillation to be shifted in a direction perpendicular to the plane of movement of said support; an externally threaded hub on the tracing lever provided with a longitudinal opening or bearing for the rod in alinement with the axis of oscillation of said lever; a nut on said hub; and a cap carried by the rod in position to engage said nut.

23. In a punch or matrix cutting machine the combination with the tracing lever and its supporting gimbal joint, of means for varying the relation of one of the two crossed axes relative to the other including micrometer adjusting devices graduated in units of the standard of measurement of the reduction or enlargement it regulates.

24. In a punch or matrix cutting machine provided with an oscillating tracing lever, a work support movable transversely of the path of said lever transmitting means intermediate said lever and support, and a longitudinally adjustable rotating cutter and in combination therewith an adjusting mechanism for the cutter provided with an index containing a graduated series of stations and a correspondingly graduated series of follower disks for the tracer lever.

25. In a punch or matrix cutting machine provided with an oscillating tracing lever, a movable work support coupled with said lever, a longitudinally adjustable rotating cutter, a pattern and means for adjusting the cutter and in combination therewith a graduated series of followers for successive application to the tracing lever and an index coupled with the cutter adjusting devices and provided with a series of graduations corresponding with the followers in number and designation.

26. In a punch or matrix cutting machine provided with a tracing lever, a movable work support coupled with said lever and a rotary cutting tool and in combination therewith a micrometer adjusting device coupled with the tool carrier and provided with an index plate equipped with a graduated series of notches designating successive stages of adjustment and a gage for entering said notches.

27. In a punch or matrix cutting machine provided with a tracing lever, work support and rotary cutting tool and in combination therewith a micrometer adjusting device for the cutter so insulated from the work and cutter as to be unaffected by the heat generated during the cutting operation.

28. In a punch or matrix cutting machine the combination with the work support and rotary cutter of a micrometer adjusting device located at a point sufficiently remote from the cutter and blank to prevent transmission to its members of the heat generated in the cutting operation.

29. In a punch or matrix cutting machine the combination with the work or blank holder and rotary cutter of a micrometer adjusting device or gage for the cutter located at a point remote from said cutter and holder and coupled with the cutter carrier through the medium of knife edge or equivalent bearings, thereby isolating said micrometer adjusting devices and preventing disturbance by heat generated by the cutter.

30. In a punch or matrix cutting machine, the combination with the cutter carrying spindle its supporting quill and means for advancing the latter longitudinally, of means for intercepting the advance of the quill and gaging the position of the cutter including a micrometer adjusting device and a lever.

31. In a punch or matrix cutting machine and in combination with the cutter carrying quill and spindle thereof, an adjusting or gaging device for the cutter including a micrometer and a lever the latter provided with knife edge or equivalent contacts for the micrometer and quill respectively.

32. In a punch or matrix cutting machine the combination with the cutter spindle and its supporting bearing of an independently supported driving pulley mounted upon but insulated from the frame and coupled with said cutter spindle to drive the latter.

33. In a punch and matrix cutting machine the combination of the following elements, to wit; a pivoted tracing lever; a movable work support coupled with said lever and provided with a blank holder; a rotary cutter supported on the frame, a driving pulley independently supported upon and insulated from the frame; a micrometer adjusting device mounted upon the frame at a point remote from the cutter and blank; and a lever with knife edge engaging surfaces or bearings interposed between the micrometer adjusting device and cutter carrier.

34. In a punch or matrix cutting machine provided with a work support and a cutter movable relatively thereto, of actuating and gaging devices for said cutter including a spring for advancing the cutter and a gaging member for limiting the advance of the cutter.

35. In a punch or matrix cutting machine, the combination of the following elements, to wit; a work support; a cutter movable toward said support; a spring operating to advance the cutter; a gage for limiting the advance of the cutter; and a micrometer for controlling the position of said gage.

36. In a punch or matrix cutting machine, the combination of the following elements, to wit; a work-support; a revoluble cutter; a quill movably supported in bearings on the frame and provided with bearings for the cutter spindle; actuating devices engaging the quill and provided with an impelling spring for advancing the cutter toward the work; and an adjustable gage limiting the advance of the quill to determine the depth of cut.

37. In a punch or matrix cutting machine the combination of the following elements, to wit; a work support; a cutter carrying quill movable relatively to said support; an adjustable gage for determining the approach of the cutter toward the work; and a spring coupled with the quill to advance the latter.

38. In a punch or matrix cutting machine the combination of the following elements, to wit; a work support; a cutter carrying quill provided with a bearing for the cutter spindle and itself movable in bearings on the frame; a spring actuated lever engaging the quill to advance the latter; and a micrometer controlled gage provided with knife edge or equivalent contact disposed in the path of said quill to arrest the advance of the latter.

39. In a punch or matrix cutting machine provided with a quill or cutter carrier movable relatively to the work support in bearings on the frame and in combination therewith a driving pulley mounted on an independent bearing on the frame and insulated from the latter by an interposed low conductor of heat; a cutter carrying spindle mounted in the quill and detachably coupled with the driving pulley; a micrometer adjusting device mounted on the frame; and a lever coupled with said micrometer and provided with a knife edge or equivalent contact in the path of the quill and serving to gage the position of the latter.

40. In a punch or matrix cutting machine provided with a tracing lever controlling the movements of a work support, a cutter adjustable relative to the work support and means for advancing and gaging the position of said cutter and in combination therewith controlling devices for said gaging and advancing means located in proximity to the pattern end of the tracing lever.

41. In a punch or matrix cutting machine the combination with the work support and relatively movable cutter carrying spindle of adjusting devices for said spindle including a gage for admeasuring the advance or position of the cutter, a spring coupled with the spindle to advance the latter, and controlling devices governing the application of said spring.

42. In a punch or matrix cutting machine, the combination with a work support and relatively adjustable cutter carrying spindle, of adjusting devices for said spindle including a lever coupled with said spindle, a spring for actuating said lever, and means controlled by the movement of said lever for alternately retracting and releasing the spring.

43. In a punch or matrix cutting machine the combination with the longitudinally adjustable cutter carrying spindle and gaging means for determining the position of said cutter, of a lever coupled with the spindle to advance the latter, said lever being extended to a point in close proximity to the pattern and provided with an actuating spring.

44. In a punch or matrix cutting machine provided with a longitudinally adjustable cutter and oscillating tracing lever and in combination therewith, a gage for measuring the advance of the cutter, a lever coupled with said cutter to advance the latter and extended to a point in proximity to the tracing end of the tracing lever, a spring for actuating the cutter adjusting lever, and means for controlling the application of said spring including a restraining trip.

45. In a punch or matrix cutting machine, the combination with the movable cutter carrier or quill thereof, of means for effecting and controlling the adjustments of the cutter, including a gage, an advancing lever, an actuating spring and a restraining device for said spring provided with a trip, the latter adapted to be operated by a movement of the lever to alternately restrain and release the spring.

46. In a punch or matrix cutting machine the combination with a movable cutter carrier or quill of an actuating lever coupled with said carrier; a spring carried by said lever and engaging a bolt, the latter adapted to contact with the frame; and a restraining latch engaging said bolt when in retracted position.

47. In a punch or matrix cutting machine and in combination with the movable cutter carrier or quill thereof of an actuating lever coupled with said carrier or quill; a spring projected bolt carried by said lever in position to engage the frame; a latch mounted upon said lever in position to engage the bolt when the latter is retracted by a movement of the lever in opposition to the pressure of said spring; and a tripping device also carried by the lever and adapted to automatically withdraw the latch by a movement of the lever.

48. In a punch or matrix cutting machine and in combination with the actuating lever for effecting the advance of the cutter carrier or quill, means controlled by the movement of said lever for automatically applying or removing spring pressure on said lever including the following elements, to wit; a spring actuated bolt carried by the lever in position to engage a fixed portion of the frame; a latch for engaging said bolt when retracted, as by a movement of the lever toward the abutment on the frame; and a trip for said latch adapted to engage the abutment on the frame, said trip engaging between shoulders on the bolt to permit limited independent movement of the latter.

49. In a punch or matrix cutting machine the combination with the removable quill or cutter carrier mounted in bearings on the frame, of a spring actuated clamp for said quill or carrier.

50. In a punch or matrix cutting machine provided with a removable quill or cutter carrier mounted in bearings on the frame, of a limiting gage and a spring for advancing and retaining said quill or carrier in contact with said gage.

51. In a punch or matrix cutting machine the combination with the quill or cutter carrier supported in bearings on the frame, of a gage for locating said quill or carrier; a spring for advancing the quill or carrier into contact with the gage; a spindle mounted in bearings in the quill; and a cutter holder mounted in said spindle and held to its seat therein by a spring.

52. In a punch or matrix cutting machine provided with a tracing lever and transmitting devices and in combination therewith the following elements, to wit; a cross-plate or supporting guide fast on the frame; a slide to which the transmitting devices are coupled supported upon said cross plate against lateral displacement; and a plate interposed between the cross plate and slide and provided with guiding means extending in transverse planes and engaging the cross plate and slide respectively.

53. In a punch or matrix cutting machine provided with a tracing lever, a work or tool carrying slide and intermediate transmitting devices and in combination therewith the following elements, to wit; a cross plate secured to the frame and provided with bearing surfaces in parallel planes coöperating with guiding surfaces on said slide to support the latter and prevent lateral displacement; a plate interposed between and engaging the slide and the cross plate, to prevent lateral displacement of said interposed plate and provided with right line guiding means disposed in transverse planes, one of said guiding means engaging complemental guiding devices on the cross plate and the other similar guiding devices on the before mentioned slide.

54. In a punch or matrix cutting machine provided with a tracing lever, a work supporting slide and transmitting devices and in combination therewith the following elements, to wit; a cross plate fixed to the frame and provided with supporting blocks $H^3$ standing above the surface of the cross plate and spaced to form guideways; an intermediate plate provided on one face with supporting surfaces or face pieces $H^4$ resting upon block $H^3$ and guide piece $H^4$ entering the guide way between the aforesaid blocks $H^3$ and on the opposite face with spaced supporting blocks $H^3$ disposed at an angle to the corresponding blocks on the cross-plate; and bearing surfaces and guide pieces applied to the work supporting slide and engaging the spaced supporting blocks of said plate.

55. In a punch or matrix cutting machine provided with a tracing lever, and a movable work support coupled with said lever and in combination therewith the following elements, to wit; a cross-plate secured to the frame; a plate interposed between said work support and cross plate; and means for accurately guiding said work support and intermediate plate one upon the other in parallel horizontal and relatively transverse vertical planes the same including spaced supporting blocks carried by the cross plate and intermediate plate and complemental guide blocks and face pieces carried by said intermediate plate and the work support.

56. In a punch or matrix cutting machine, the combination of the following elements, to wit; a cross plate fixed to the frame; a plate supported to reciprocate in a right line upon said cross-plate; a work or tool carrying slide supported to reciprocate in a plane parallel with but in a direction transverse to the line of movement of the said plate; a tracing lever and transmitting devices coupling said lever and carrying slide.

57. In a punch or matrix cutting machine the combination of the following elements, to wit; a cross-plate fixed to the frame; a plate supported and guided to reciprocate in a right line on said cross-plate; a work carrier superposed and guided upon said plate to move in a plane parallel with and in a direction transverse to the line of movement of said plate; a tracing lever whose path of movement intersects the planes of movement of said work carrier and plate; and transmitting devices connecting the tracing lever and work carrier.

58. In a punch and matrix cutting machine the combination of the following elements, to wit; a stationary cross plate or support; a plate guided to reciprocate in a right line on said cross plate; a carrier slide supported upon bearing surfaces carried by said plate and cross-plate respectively and guided upon said intermediate plate to move in a plane parallel therewith but in a direction transverse to the line of motion of said intermediate plate; and a pantograph or tracing lever coupled with said carrier slide to control the direction and extent of movement of the latter.

59. In a punch or matrix cutting machine, the combination of the following elements, to wit; a cross plate or support; a carrier slide mounted to reciprocate in a plane upon said support; a plate interposed between and guided upon said cross plate and carrier slide; a tracing lever, and means for communicating motion from said lever to said carrier slide.

60. In a punch or matrix cutting machine, the combination of the following elements, to wit; a tracing lever; a movable work support provided with a socket; a bearing block adjustable in said socket; a tracing lever; and a transmitting device including a spherical member pivotally supported in said adjustable bearing block and provided with an arm or extension engaging a bearing on the tracing lever.

61. In a punch or matrix cutting machine, the combination of the following elements, to wit; a tracing lever; a work support guided to reciprocate in a plane and provided with a socket or bearing extending in a direction perpendicular to the plane of motion of said support; and a rod carried in a bearing on the tracing lever in line with its axis of oscillation and provided with a ball and socket joint one member whereof is adjustably secured in the socket or bearing of the work support.

62. In a punch or matrix cutting machine provided with a pantograph or tracing lever and in combination therewith a supporting bridge for said lever connected to the frame at opposite extremities by slip joints.

63. In a punch or matrix cutting machine and in combination with the pantograph or tracing lever thereof, a supporting bridge connected to the frame on opposite sides of the point of suspension of said lever by slip joints.

64. In a punch or matrix cutting machine and in combination with its pantograph or tracing lever, a supporting bridge for said lever connected to the frame near the point of suspension or working axis of the lever with its opposite ends connected to the frame by slip joints.

65. In a punch or matrix cutting machine provided with a pantograph or tracing lever, a movable work support and intermediate transmitting means and in combination therewith the following elements, to wit; a frame provided with uprights; a cross plate fast to said uprights and providing bearings for the work support; and a bridge secured to said cross-plate intermediate the uprights with its ends connected to the latter by slip joints, said bridge serving to support the tracing lever.

66. In a punch or matrix cutting machine the combination of the following elements, to wit; a frame provided with uprights; a cross-plate fast at opposite ends to said uprights; a work support mounted upon said cross plate; a bridge in parallel relation to said cross-plate, attached to the latter on opposite margins intermediate the uprights and having its opposite ends secured to the uprights by slip joints, a tracing lever pivotally supported upon said bridge; and transmitting devices coupling said tracing lever and work support.

67. In a punch or matrix cutting machine the combination with the pantograph or tracing lever thereof provided with a spherical bearing at the tracing end of a follower provided with a conical seat for the reception of said spherical bearing.

68. In a punch or matrix cutting machine provided with a pantograph or tracing lever coöperating with a pattern to control the direction of cut and in combination therewith a spherical bearing applied to the pattern or tracing end of said lever and a follower disk provided with a central conical seat for the reception of said spherical bearing.

69. In a punch or matrix cutting machine and in combination with the pantograph or tracing lever thereof, a spherical bearing applied to the tracing end of said lever and a follower disk provided with a central hub or lateral extension containing a conical seat for the reception of said spherical bearing.

70. In a punch or matrix cutting machine and in combination with the pantograph or tracing lever thereof provided with a spherical bearing at its tracing end, of a follower disk provided with a conical seat for the spherical bearing the dimensions of said seat in the plane of the upper edge of the disk coinciding with the diameter of said spherical bearing.

71. In a punch or matrix cutting machine and in combination with its tracing stylus, a series of graduated followers and a movable holder therefor located in proximity to said stylus and provided with a series of compartments.

72. In a punch or matrix cutting machine provided with a pattern support or table and a pantograph or tracing lever and in combination therewith, a plurality of followers, a movable holder therefor located on the pattern support in proximity to the tracing end of said lever, and provided with a series of cells or receptacles, one for each follower, and means whereby the individual cells are presented in position to permit the withdrawal or return of its follower while in engagement with the tracing lever.

73. In a punch or matrix cutting machine and in combination with the pantograph or tracing lever thereof a follower carrier and holder located in proximity to the tracing end of said lever and comprising a pivoted plate or support and a holder pivoted eccentrically on said plate and provided with a plurality of cells for the reception of the followers.

74. In a punch or matrix cutting mechine, the combination with the pantograph or tracing lever thereof, a follower carrier and holder located in proximity to the tracing end of said lever and comprising a pivoted plate or support and a disk pivotally attached to said support to one side of the axis of the latter and provided with a series of radial notches for the reception of the followers.

75. In a punch or matrix cutting machine, the combination with the pantograph or tracing lever thereof, a follower carrier and holder located in proximity to the tracing end of said lever and comprising a pivoted support, a radially notched or slotted disk or plate pivoted upon said support eccentrically to the axis of the latter and a cover plate provided with a notch or opening opposite the tracing lever.

76. In a punch or matrix cutting machine and in combination with the pantograph or tracing lever and table thereof, a pattern holder provided with a locating index or gage adapted to enter a notch or recess in the pattern to locate the latter.

77. In a punch or matrix cutting machine and in combination with the pantograph or tracing lever thereof, a pattern adjusting and supporting means including a table or platen provided with a gaging surface and an opposed slide the latter provided with an angular projection adapted to enter a notch in one edge of the pattern to locate the latter in predetermined relation to the cutting axis of the machine.

78. In a punch or matrix cutting machine and in combination with the pantograph or tracing lever thereof, pattern holding and adjusting devices including a slide adjustable transversely of the cutting axis of the machine and carrying a gaging surface or abutment and an opposed slide the latter provided with an angular projection for engagement with a notch in the edge of the pattern.

79. In a punch or matrix cutting machine and in combination with the pantograph or tracing lever thereof, a pattern holder provided with a gaging surface, an opposed slide provided with an angular projection for engagement with a locating notch in the pattern, and two side clamps engaging opposite edges of the pattern.

80. In a punch or matrix cutting machine a pattern holding and adjusting device including a gaging surface, an opposed slide, and a gaging device detachably applied to said slide and provided with an angular projection for entering a notch in the pattern plate.

FRANK HINMAN PIERPONT.

Witnesses:
EUSTACE H. BARKER,
JOHN J. NEWPORT.